US012776971B2

(12) United States Patent
Ford et al.

(10) Patent No.: US 12,776,971 B2
(45) Date of Patent: Oct. 27, 2026

(54) NETWORK ANALYSIS USING DATASET SHIFT DETECTION

(71) Applicant: Samsung Electronics Co., Ltd., Suwon-si (KR)

(72) Inventors: Russell Ford, Campbell, CA (US); Yan Xin, Princeton, NJ (US)

(73) Assignee: Samsung Electronics Co., Ltd., Suwon-si (KR)

( * ) Notice: Subject to any disclaimer, the term of this patent is extended or adjusted under 35 U.S.C. 154(b) by 97 days.

(21) Appl. No.: 18/191,612

(22) Filed: Mar. 28, 2023

(65) Prior Publication Data

US 2024/0333615 A1 Oct. 3, 2024

(51) Int. Cl.
*H04L 43/045* (2022.01)
*H04L 41/142* (2022.01)
*H04L 43/55* (2022.01)

(52) U.S. Cl.
CPC .......... *H04L 43/045* (2013.01); *H04L 41/142* (2013.01); *H04L 43/55* (2022.05)

(58) Field of Classification Search
CPC ...... H04L 43/045; H04L 43/55; H04L 41/142
See application file for complete search history.

(56) References Cited

U.S. PATENT DOCUMENTS 10,378,997 B2 8/2019 Ide et al.
11,227,192 B1 1/2022 Rahnama-Moghaddam et al.
11,308,077 B2 4/2022 Haim et al.
11,310,141 B2 4/2022 Kolar et al.
11,361,197 B2 6/2022 Calmon et al.
2011/0228859 A1* 9/2011 Sugimoto ............ H04N 19/159 375/240.26
2014/0114609 A1 4/2014 Maurer et al.
2016/0173211 A1* 6/2016 Ouyang ................. H04B 17/16 455/425
2016/0274893 A1* 9/2016 Thomas .................... G06F 8/71
2019/0166024 A1* 5/2019 Ho .......................... H04L 41/16
2021/0073200 A1* 3/2021 Borra .................. G06F 16/2358
2021/0390453 A1 12/2021 Hatch et al.
2022/0173965 A1 6/2022 Martin et al.

(Continued)

OTHER PUBLICATIONS

"2019 Annual Report", AT&T Inc., Feb. 2020, 16 pages.

(Continued)

*Primary Examiner* — Dhairya A Patel
*Assistant Examiner* — Eui H Kim

(57) ABSTRACT

Methods and apparatuses for automating configuration management in cellular networks. A method of a computing device comprises: assigning, based on a correlation analysis, contexts to different time intervals of data, wherein the correlation analysis is performed based on historic time-series data; grouping, based on the assigned contexts, the historic time-series data; identifying context and compute an anomaly score comparing new data and the grouped historic-time series data of the context; indicating an event of anomaly based on a determination that the computed anomaly score exceeds a first threshold that is identified based on a function of per-context data; and computing, based on the event of the anomaly, an aggregate anomaly score or indicate using a value of mean or moving average of a set of latest anomaly scores, for a context-based multivariate anomaly detection.

18 Claims, 25 Drawing Sheets

(56) References Cited

U.S. PATENT DOCUMENTS

| | | | | |
|---|---|---|---|---|
| 2022/0245013 | A1* | 8/2022 | Ciabarra, Jr. | G06F 11/079 |
| 2023/0300159 | A1* | 9/2023 | Lin | H04L 41/145<br>726/23 |
| 2024/0311650 | A1* | 9/2024 | Rahimi | G06N 20/20 |

OTHER PUBLICATIONS

"Small cells market status report", Small Cell Forum, Document No. 050.10.03, Dec. 2018, 22 pages.

Stephens, "EDF Statistics for Goodness of Fit and Some Comparisons", Journal of the American Statistical Association, vol. 69, No. 347, Sep. 1974, pp. 730-737.

Nielsen, "On the Jensen-Shannon Symmetrization of Distances Relying on Abstract Means", Entropy, vol. 21, No. 5, May 2019, 23 pages.

Friedman, "On Multivariate Goodness-of-Fit and Two-Sample Testing", Proceedings of the Conference on Statistical Problems in Particle Physics, Astrophysics and Cosmology (PHYSTAT2003), Sep. 2003, pp. 311-313.

Boracchi et al., "QuantTree: Histograms for Change Detection in Multivariate Data Streams", Proc. 35th International Conference on Machine Learning, Jul. 2018, 10 pages.

* cited by examiner

600

(a) Group 1, hour interval 1

(b) Group 2, hour interval 2

(c) Group 2, hour interval 1

2300

(a) Meta p-value from comparing data grouped by hour interval (b) Meta p-value from comparing data not grouped by hour interval

NETWORK ANALYSIS USING DATASET SHIFT DETECTION

TECHNICAL FIELD

The present disclosure relates generally to communication systems and, more specifically, the present disclosure relates to network analysis using dataset shift detection in a communication network.

BACKGROUND

The size and complexity of today's cellular networks makes their management highly challenging and costly for cellular operators. In cellular networks, a large volume of metadata is generated by network devices such as base stations, core network elements and end-user devices. This metadata includes performance management (PM) data (often time-series data such as counters, performance metrics, and measurements), fault management (FM) data, such as alarm events that indicate a device has entered an erroneous state, and configuration management (CM) data, such as the configuration parameters and values of various network devices. To maintain good service quality for end-users, operators should continuously monitor network performance benchmarks, such as key performance indicators (KPIs) and key quality indicators (KQIs), for thousands of base stations and other devices in the network. The task of monitoring the network by human engineers thus becomes daunting.

SUMMARY

The present disclosure relates to communication systems and, more specifically, the present disclosure relates to network analysis using dataset shift detection in a communication network.

In one embodiment, a computing device in a communication system, the computing device comprises memory; and a processor operably connected to the memory, the processor configured to: assign, based on a correlation analysis, contexts to different time intervals of data, wherein the correlation analysis is performed based on historic time-series data, group, based on the assigned contexts, the historic time-series data, identify context and compute an anomaly score comparing new data and the grouped historic-time series data of the context, indicate an event of anomaly based on a determination that the computed anomaly score exceeds a first threshold that is identified based on a function of per-context data, and compute, based on the event of the anomaly, an aggregate anomaly score or indicate using a value of mean or moving average of a set of latest anomaly scores, for a context-based multivariate anomaly detection.

In another embodiment, a method in a communication system, the method comprises: assigning, based on a correlation analysis, contexts to different time intervals of data, wherein the correlation analysis is performed based on historic time-series data; grouping, based on the assigned contexts, the historic time-series data; identifying context and compute an anomaly score comparing new data and the grouped historic-time series data of the context; indicating an event of anomaly based on a determination that the computed anomaly score exceeds a first threshold that is identified based on a function of per-context data; and computing, based on the event of the anomaly, an aggregate anomaly score or indicate using a value of mean or moving average of a set of latest anomaly scores, for a context-based multivariate anomaly detection.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system, or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of this disclosure may be implemented in any suitably arranged device or system.

Figure 1:
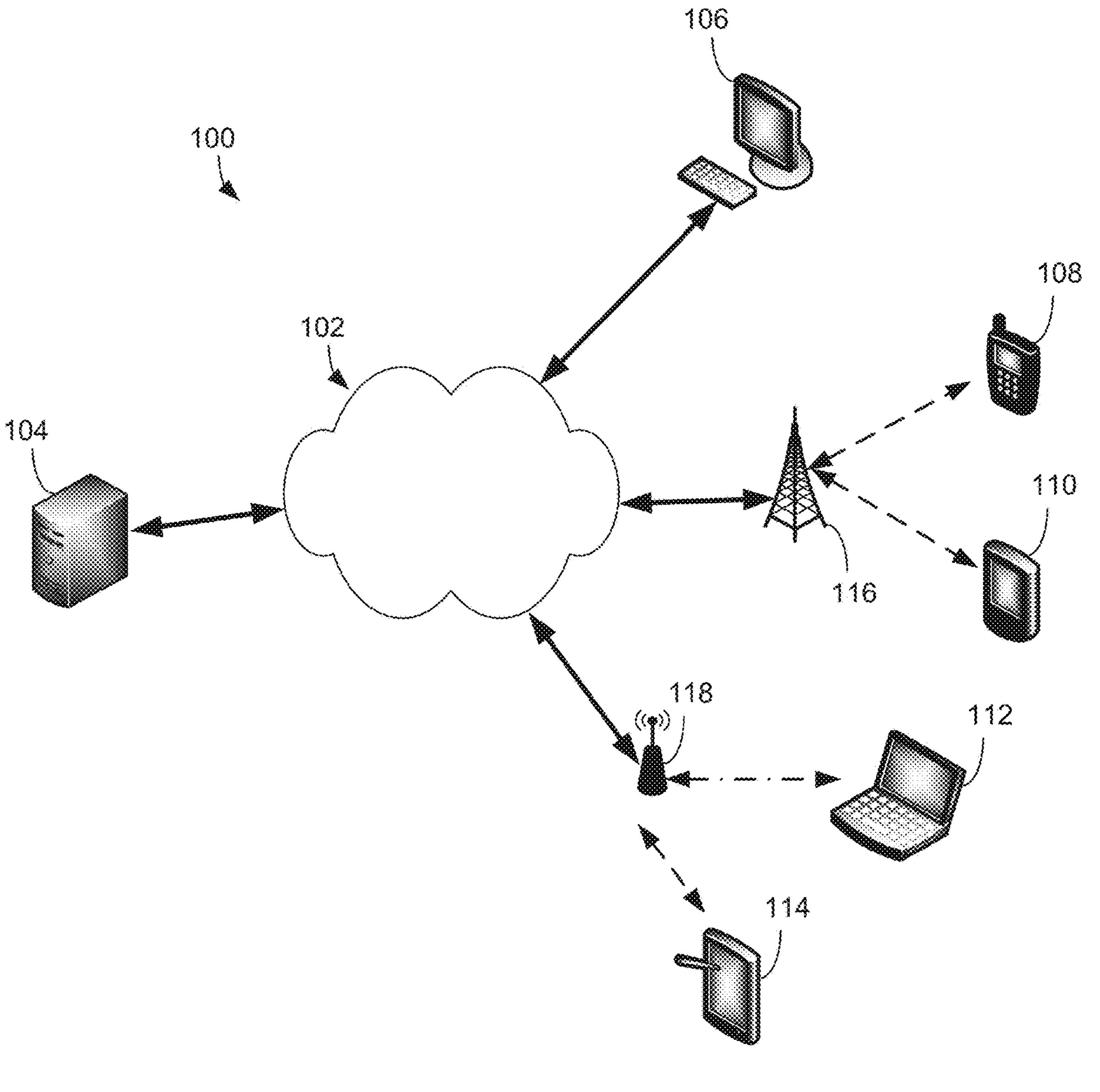
FIG. 1 illustrates an example of computing system according to embodiments of the present disclosure.

FIG. 1 illustrates an example computing system 100 according to this disclosure.

The embodiment of the computing system 100 shown in FIG. 1 is for illustration only. Other embodiments of the computing system 100 could be used without departing from the scope of this disclosure.

As shown in FIG. 1, the system 100 includes a network 102, which facilitates communication between various components in the system 100. For example, the network 102 may communicate internet protocol (IP) packets, frame relay frames, asynchronous transfer mode (ATM) cells, or other information between network addresses. The network 102 may include one or more local area networks (LANs), metropolitan area networks (MANs), wide area networks (WANs), all or a portion of a global network such as the Internet, or any other communication system or systems at one or more locations.

The network 102 facilitates communications between at least one computing device (e.g., a server, a network entity, a network node etc.) 104 and various client devices 106-114 such as a user equipment (UE), a terminal, or any device including capability of communication. Each computing device 104 includes any suitable computing or processing device that can provide computing services for one or more client devices. Each computing device 104 could, for example, include one or more processing devices, one or more memories storing instructions and data, and one or more network interfaces facilitating communication over the network 102.

Each client device 106-114 represents any suitable computing or processing device that interacts with at least one computing device (e.g., a server, a network node, a network entity, etc.) or other computing device(s) over the network 102. In this example, the client devices 106-114 include a desktop computer 106, a mobile telephone or smartphone 108, a personal digital assistant (PDA) 110, a laptop computer 112, and a tablet computer 114. However, any other or additional client devices could be used in the computing system 100.

In this example, some client devices 108-114 communicate indirectly with the network 102. For example, the client devices 108-110 communicate via one or more base stations 116, such as cellular base stations or eNodeBs. Also, the client devices 112-114 communicate via one or more wireless access points 118, such as IEEE 802.11 wireless access points. Note that these are for illustration only and that each client device could communicate directly with the network 102 or indirectly with the network 102 via any suitable intermediate device(s) or network(s).

Although FIG. 1 illustrates one example of a computing system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
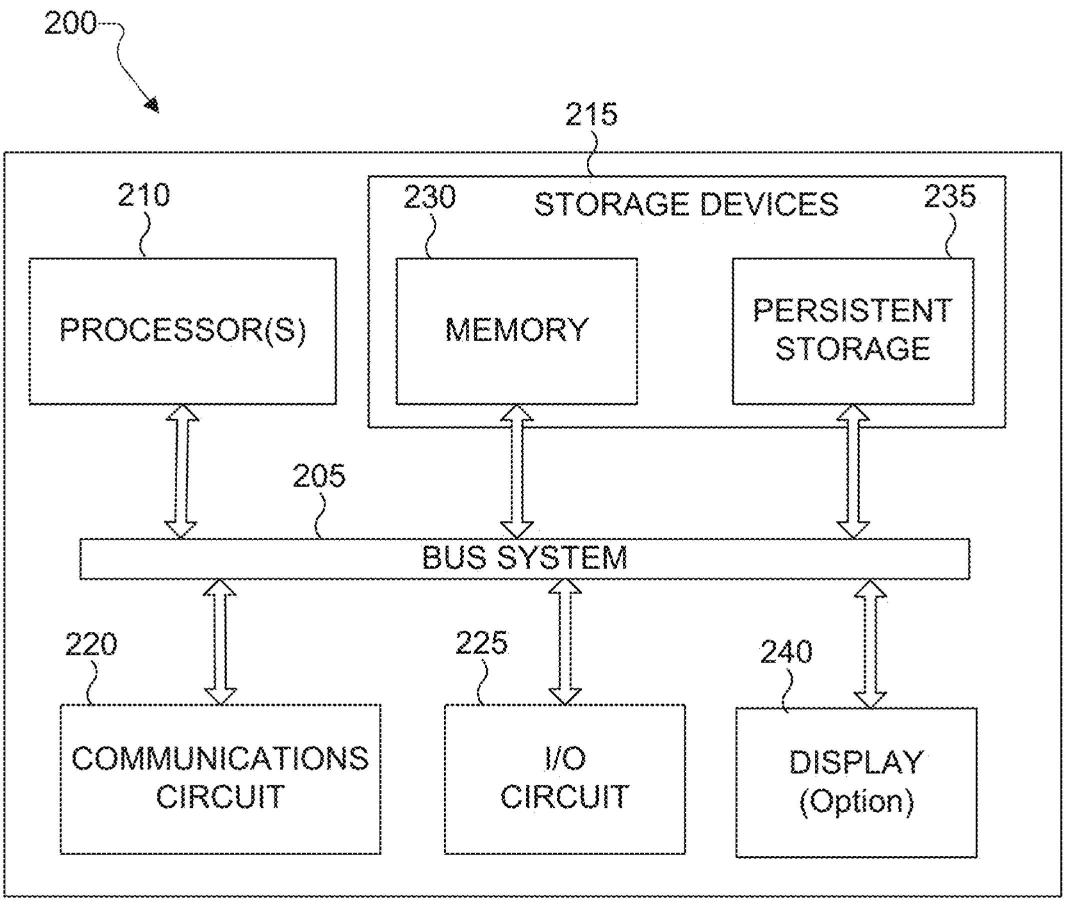
FIG. 2 illustrates an example of computing device according to embodiments of the present disclosure.

FIG. 2 illustrates an example of a computing device (e.g., network device) in a computing system according to this disclosure. In particular, FIG. 2 illustrates an example computing device 200 (e.g., a server, a network node, client device). The computing device 200 could represent the computing device 104 or any of the client devices 106-114 in FIG. 1.

As shown in FIG. 2, the computing device 200 includes a bus system 205, which supports communication between at least one processor 210, at least one storage device 215, at least one communications circuit 220, and at least one input/output (I/O) unit 225.

The processor 210 executes instructions that may be loaded into a memory 230. The processor 210 may include any suitable number(s) and type(s) of processors or other devices in any suitable arrangement. Example types of processor 210 include microprocessors, microcontrollers, digital signal processors, field programmable gate arrays, application specific integrated circuits, and discreet circuitry. The processor 210 is also capable of executing other processes and programs resident in the memory 230, such as processes for network analysis using dataset shift detection in a communication network.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random access memory or any other suitable volatile or non-volatile storage device(s). The persistent storage 235 may contain one or more components or devices supporting longer-term storage of data, such as a ready only memory, hard drive, Flash memory, or optical disc.

The communications circuit 220 supports communications with other systems or devices. For example, the communications circuit 220 could include a network interface card or a wireless transceiver facilitating communications over the network 102. The communications circuit 220 may support communications through any suitable physical or wireless communication link(s).

The I/O circuit 225 allows for input and output of data. For example, the I/O circuit 225 may provide a connection for user input through a keyboard, mouse, keypad, touchscreen, or other suitable input device. The I/O circuit 225 may also send output to a display, printer, or other suitable output device.

The processor 210 is also coupled to the display 240. The display 240 may be a liquid crystal display or other display capable of rendering text and/or at least limited graphics, such as from web sites.

Note that while some discussion of FIG. 2 is provided as representing the computing device 104 (e.g., a server, a network node, a network entity, etc.) of FIG. 1, the same or similar structure is used in one or more of the client devices 106-114. For example, a laptop or desktop computer, a mobile device, UE, etc. could have the same or similar structure as that shown in FIG. 2. The base stations come in a wide variety of configurations, and FIG. 2 does not limit the scope of this disclosure to any particular implementation of a base station.

Although FIG. 2 illustrates examples of a computing device (e.g., network or client devices) in a computing system, various changes may be made to FIG. 2. For example, various components in FIG. 2 could be combined, further subdivided, or omitted and additional components could be added according to particular needs. As a particular example, the main processor 340 could be divided into multiple processors, such as one or more central processing units (CPUs) and one or more graphics processing units (GPUs). In addition, as with computing and communication networks, client devices and servers (e.g., network entities) can come in a wide variety of configurations, and FIG. 2 does not limit this disclosure to any particular client device or computing device (e.g., a server, a network entity).

Algorithms for automated network analytics, which may be based on machine learning (ML) and artificial intelligence (AI), are commonly employed to assist with network monitoring and detecting faults or unexpected behavior. AI/ML-based network analytics is currently a highly active research area. Some example algorithms and their use cases may include the following.

In one embodiment, traffic and KPI prediction is provided. In this embodiment, a statistical model or algorithm such as autoregressive integrated moving average (ARIMA), AI/ML-based model or other type of predictive algorithm may be trained using historical data to detect future trends in one or more KPIs like traffic volume or throughput. Such an algorithm is useful for characterizing future traffic demand or predicting future network anomalies or faults. Many algorithms have been provided for KPI prediction in prior art and are not within the scope of this DOI.

In one embodiment, anomaly detection (AD) is provided. In such embodiment, AD algorithms can automatically detect and flag when network behavior deviates from a nominal or expected state. Threshold-based AD is commonly used to detect when network KPIs have exceeded expected bounds, e.g., cell throughput dropping below 2 Mbps. Additionally, many more advanced AD systems have been provided, some of which make use of AI/ML to capture the expected network behavior and subsequently detect deviations of one or more KPIs or state variables.

In one embodiment, root cause analysis (RCA) is provided. In such embodiment, once a network anomaly has been detected, an algorithm may characterize the type of fault or other event and identify its root cause. RCA algorithms based on data mining, AI/ML or other techniques learn from historic data to group similar types of network events and recommend a root cause label or other diagnostic information, which is useful for engineers to perform troubleshooting.

Figure 3:
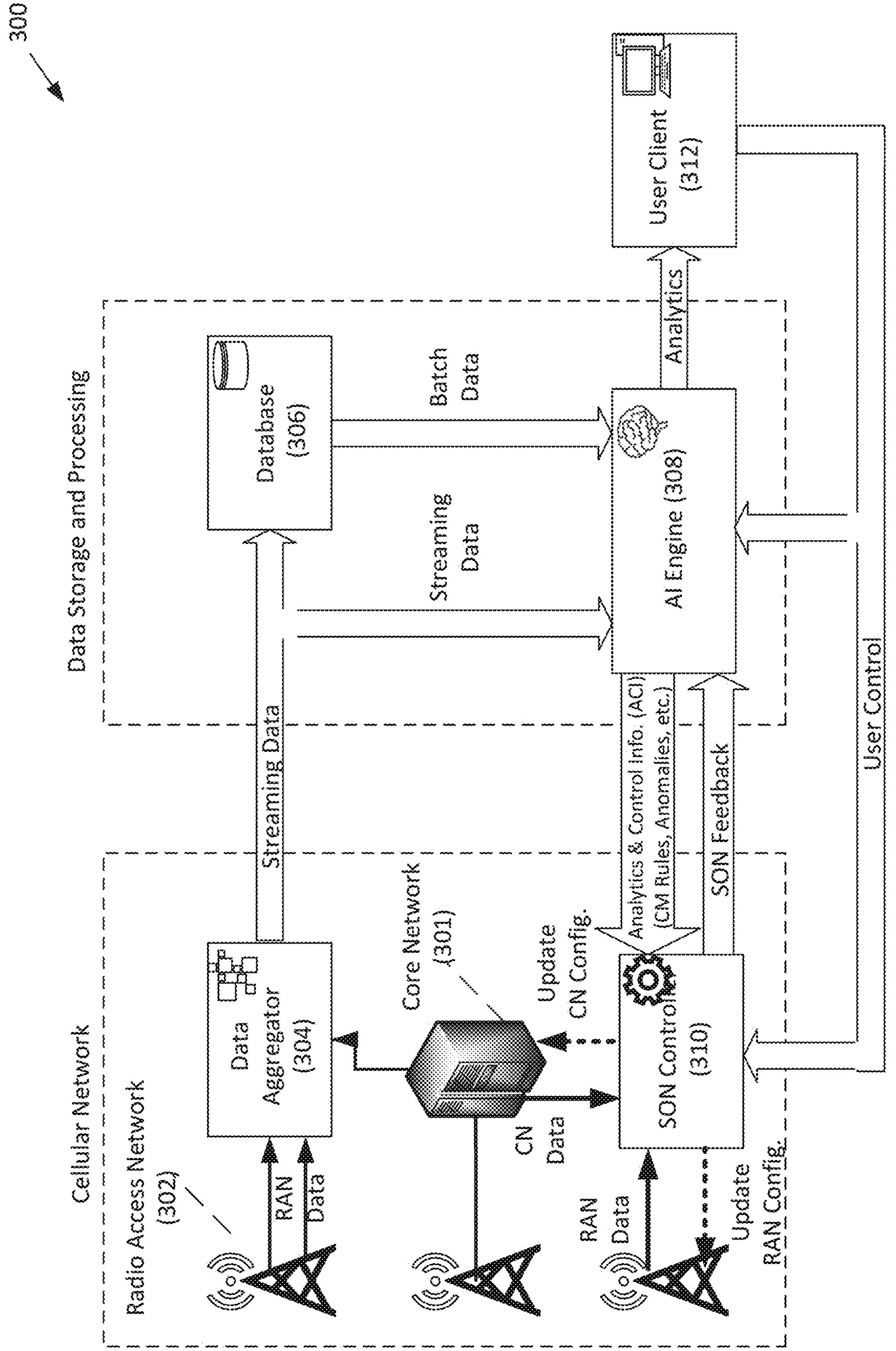
FIG. 3 illustrates an example of top-level architecture of the advanced network analytics and automation system according to embodiments of the present disclosure.

FIG. 3 illustrates an example of top-level architecture of the advanced network analytics and automation system 300 according to embodiments of the present disclosure. An embodiment of the top-level architecture of the advanced network analytics and automation system 300 shown in FIG. 3 is for illustration only.

FIG. 3 depicts the top-level architecture of the provided advanced network analytics and automation system. The data source is the cellular network infrastructure, including the core network (CN) and radio access network (RAN) shown in elements 301 and 302, respectively. RAN data may include measurements, metrics and other data collected from base station (e.g., eNodeB or gNodeB) and UE devices. Data from CN and RAN may be collected and aggregated at one or more intermediate nodes (304), which may be referred to as data aggregators, element management systems (EMS) or LTE management systems (LMS). The data may include PM data such as KQIs/KPIs, counters, metrics, which may be in the form of structured time series data or as unstructured data, such as log files. FM data may also be included; such as alarms events indicating a device failure or error state has occurred in the network. Moreover, CM data may be included; such as a log of configuration changes including timestamps and IDs of the network devices with before and after parameter values.

Network data from the data aggregator may be transferred and stored in a database (306). Batches of historical data can then be retrieved from the database by an artificial intelligence (AI) engine (308), which processes the data to provide various CM analytics and inference capabilities. Data may also be streamed directly from the RAN/CN or data aggregator to the AI engine for real-time processing.

The AI engine performs computation on the input data and produces analytics and control information (ACI), which may then be sent to one or more SON controllers (310). Note that the AI engine, along with the SON controller may be hosted at a datacenter or local central office near the RAN, or may be collocated with a BS itself. SON controllers use the ACI from the AI engine to automatically perform actions on the network such as updating the configuration of one or more network elements. The AI engine also specifies in the ACI messages which devices or variables are of interest for the SON controller to monitor, so that the SON controller may only monitor a subset of network devices and data variables for more efficient operation. SON controllers may also provide feedback messages to the AI engine about the state of the monitored devices and variables, so that the AI engine can quickly adapt to changing network conditions and provide updated ACI to the SON controllers.

Analytics information generated by the AI engine may be transmitted to a user client (312) for analysis by a network operations engineer in user client information (UCI) messages. The user client can display the analytics results in a user interface, which may include data tables, plots and other visualizations of the PM/CM/FM data along with anomalies or faults that have been detected, root cause analysis (RCA) of the faults, and configuration parameters that may be correlated with the results. Additionally, the user interface may accept commands from the user, which may be sent to the SON controller or directly to the network elements to perform an action, such as a configuration update. Commands or feedback may also be sent by the user to the AI engine. This feedback may be used by the AI engine to adjust its analysis results, for example, by retraining one or more ML algorithms. For example, a user may provide feedback to the AI engine indicating the root cause of certain anomaly events, or an indication of whether the automatic RCA diagnosis from the AI engine was correct or not.

In each of the aforementioned applications, analytics automation relies on first analyzing and extracting information from historic data in order to generate a result pertaining to the current or future network state. For statistical or AI/ML-based algorithms, information about the expected distribution of the data is captured in a model. Some well-known models are capable of representing time varying signals, which is not strictly or wide-sense stationary, meaning the probability distributions of the model inputs changes over time. Models such as ARIMA or recurrent neural networks (RNNs), notably long short-term memory (LSTM) networks, are capable of capturing both cyclo-stationary periodic or seasonal trends, as well as long-term trends, i.e., a gradual increase or decrease in a KPI.

Figure 4A:
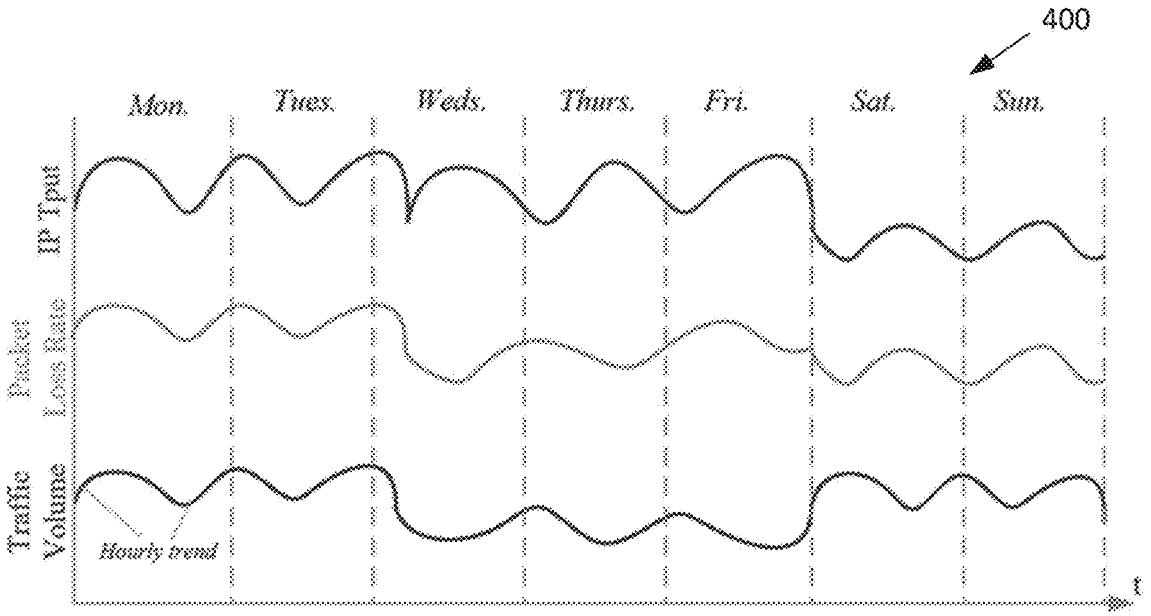
FIG. 4A illustrates an example of hourly and daily cyclostationary trends due to seasonality in KPI data according to embodiments of the present disclosure.

FIG. 4A illustrates an example of hourly and daily cyclostationary trends due to seasonality in KPI data 400 according to embodiments of the present disclosure. An embodiment of the hourly and daily cyclostationary trends due to seasonality in KPI data 400 shown in FIG. 400 is for illustration only.

Figure 4B:
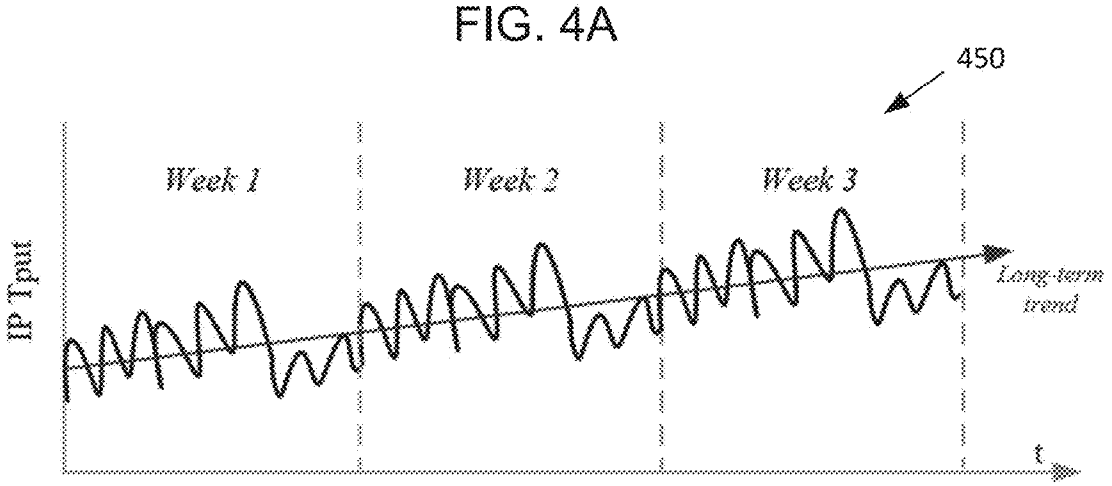
FIG. 4B illustrates an example of long-term trend in KPI data according to embodiments of the present disclosure.

FIG. 4B illustrates an example of long-term trend in KPI data 450 according to embodiments of the present disclosure. An embodiment of the long-term trend in KPI data 450 shown in FIG. 4B is for illustration only.

Figure 4C:
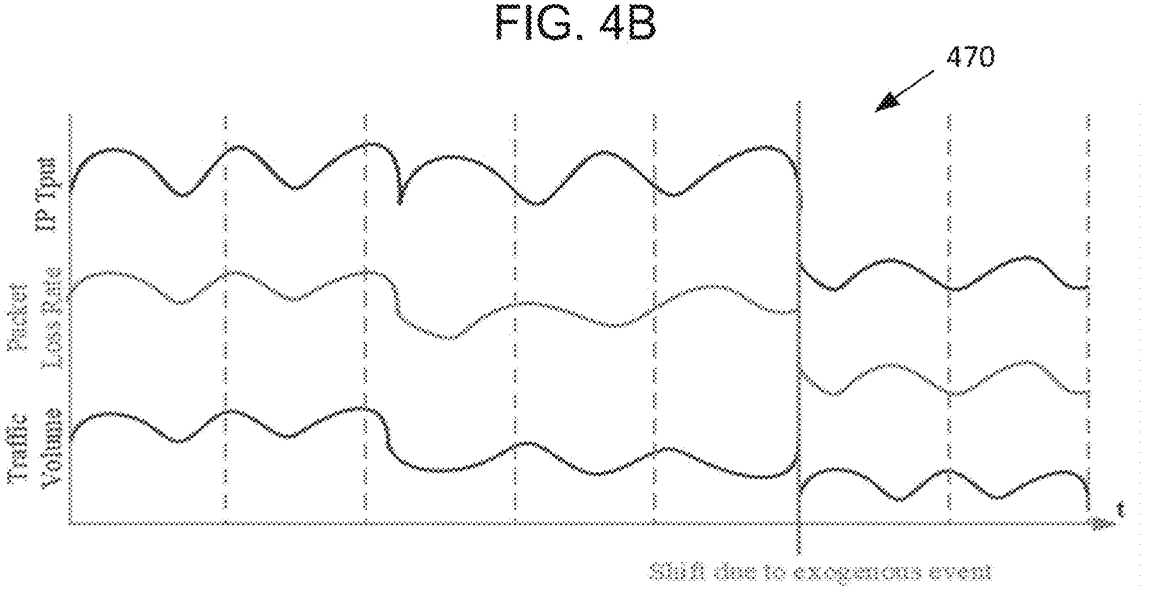
FIG. 4C illustrates an example of Sudden dataset shift due to external event according to embodiments of the present disclosure.

FIG. 4C illustrates an example of sudden dataset shift due to external event 470 according to embodiments of the present disclosure. An embodiment of the sudden dataset shift due to external event 470 shown in FIG. 4C is for illustration only.

Rarely, however, network metadata is perfectly stationary or cyclostationary. Many hidden factors, which may be constantly changing, can affect the data distribution unpredictably. These factors may include changes in user usage patterns and traffic demand, changes in user spatial distribution patterns, changes in network topology, e.g., by installing or removing one or more network devices, software upgrades to network devices, changes in configuration, hardware failures or other faults. For wireless networks, changes in radio frequency propagation characteristics may occur due to weather or other environmental factors, which can be a source of unpredictable fluctuations in the data distribution. The phenomenon of changing data distribution, often brought on by changes to processes which generate the data, is commonly known as dataset shift and the problem of detecting cases of dataset shift is known as dataset shift or change detection.

In general, training a machine learning model entails learning the conditional probability $P(y|x)$, where x and y are pairs of input feature data and a corresponding target variable or label, respectively. For generative models, the prior probability $P(x)$ is also estimated, whereas for discriminative models it is not required. For regression problems, the objective is to learn a functional mapping of the form $y=f(x)$ to predict a real-valued target variable y from a set of training features or covariates x. In the case of classification problems, y is a discrete variable belonging to one or more classes.

In either case, the high-level objective of any learning problem is to estimate the conditional distribution from a set of training data pairs $$\langle y_i^{train}, x_i^{train} \rangle,\ i = 1 \ldots N^{train}.$$

For the model to be of practical use, it may be trained in a manner such that it is capable of accurately predicting y' from corresponding new and unseen feature data x'. To this end, the accuracy of the model may be tested on a set of held-out data pairs $$\langle y_i^{test}, x_i^{test} \rangle,\ i = 1 \ldots N^{test}.$$

A shift in distribution between the training set and unseen test set may thus be detrimental to model performance. Additionally, dataset shift detection can also be employed as a means of anomaly detection.

Problems of dataset shift can arise in one of the following cases. In one example of covariate shift, the distribution of the feature data used for testing is different from that used for training, while the conditional probability remains the same. Formally, $P^{train}(x) \neq P^{test}(x)$, and $P^{train}(y|x) = P^{test}(y|x)$.

In another example of prior probability or label shift, only the distribution of the target variable differs between training and test sets: $P^{train}(y) \neq P^{test}(y)$ and $P^{train}(y|x) = P^{test}(y|x)$.

In another example of concept shift, a shift in the functional relationship between y and x is provided: $P^{train}(y|x) \neq P^{test}(y|x)$.

The techniques in this work deal mainly with detecting covariate and prior probability shift. As mentioned, dataset shift may come about from changes in the external environment. However, it may also result from bias during the training process. Sample selection bias, class imbalances and changes in measurement can cause such bias. However, these cases are not considered in this work.

In this work, several methods for analyzing dataset shift are provided, which provide useful capabilities for network engineers to understand changes in network performance and behavior.

In one embodiment, multivariate dataset shift detection is provided. In such embodiment, methods are provided to detect distribution shift between sets of multivariate feature data, comprising of computing a set of test statistics by repeated sampling of a reference dataset X and then comparing the empirical distribution of statistics to a test statistic or set of statistics computed between the reference dataset X and another dataset Z. A score is then computed, which represents the amount of deviation between X and Z.

In one embodiment, context-based anomaly detection and CM change impact profiling is provided. In one example of context-based anomaly detection, methods are provided by which different contexts of data are identified via correlation analysis or other methods. A historic dataset is grouped based on these contexts, which represent some time period or distinct state of the network or environment, with the purpose of reducing distribution shift between samples of data associated with each context due to normal fluctuations or noise. Then, dataset shift detection techniques are applied to detect distribution changes between historic samples and new samples belonging to the same type of context.

In another example of profiling performance impact of network configuration changes, a method for analyzing differences between different context groups, for example, groups of data associated with specific parameter changes, is provided, which comprises of computing distance metrics between pairs of context-specific data and then performing cluster analysis to group devices experiencing a similar impact to KPIs from the same type of parameter changes.

In yet another example of predicting model performance loss based on dataset shift, methods are provided to identify when the performance of an ML or other analytical model has become reduced due to distribution shift between the original training data and a dataset sampled at a later time. The general approach of these methods compute distance metrics between a reference distribution, used for training, with other test datasets and correlate these distances with the model performance measured by some accuracy or error metric (e.g., R-squared score).

Figure 5:
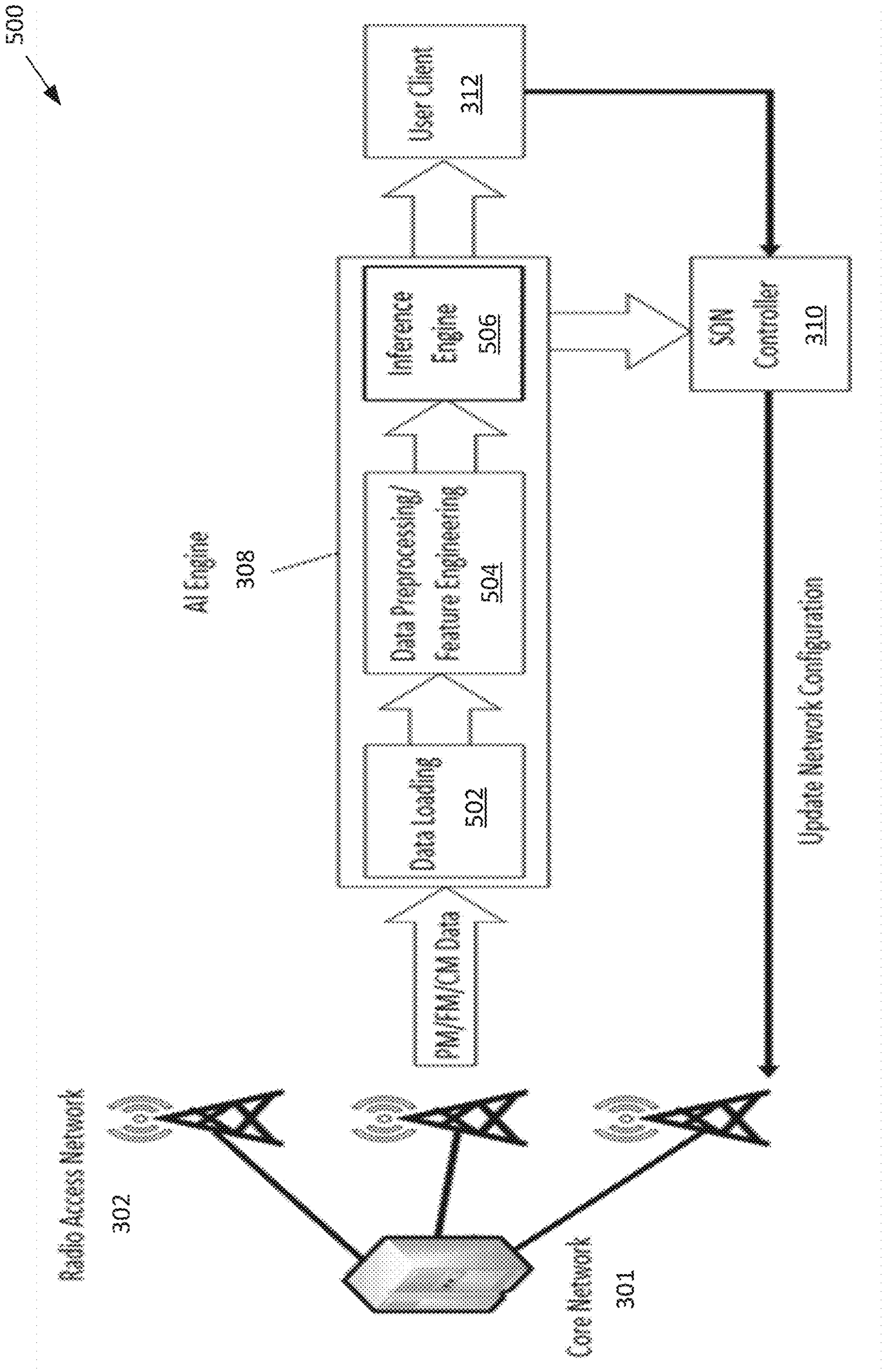
FIG. 5 illustrates an example of AI engine according to embodiments of the present disclosure.

FIG. 5 illustrates an example of AI engine 500 according to embodiments of the present disclosure. An embodiment of the AI engine 500 shown in FIG. 5 is for illustration only.

The AI engine (308) performs the CM analytics functions. FIG. 5 depicts the components of the AI engine, namely the data loading operation (502), the data preprocessing/feature engineering operation (504), and the inference engine (506), which are explained below in more detail.

In the operation 502, PM, FM, and CM data are loaded into the AI engine. Batches of network data may be retrieved from the database (306), or data may be streamed directly from the data aggregator (304) (e.g., data aggregator) to the AI engine (see also FIG. 3). The provided system supports both offline processing of batch data and real-time processing of streaming data.

The operation 504 may include, but is not limited to: (1) removing invalid data samples, normalizing or scaling the data; (2) removing trends and seasonality in time-series data; (3) generating additional synthetic features from the existing KPIs and other fields in the data; (4) selecting a subset of the data samples or fields, such as a specific timeframe or a group of network devices; and/or (5) merging the PM/FM and CM data into a combined data set, for example, by matching the eNodeB/gNodeB ID and cell number fields and the timestamp of entries in the PM/FM data and the CM data.

As an example, the operation 504 may include following steps.

In one example of step of data cleaning and filtering, an operation filters out the non-busy hour, weekend, and US holiday data, and removes the data corresponding to outliers and missing values. The busy hours are defined as from 8:00 am to 21:00 pm; weekend consists of Saturday and Sunday; US holidays can be selected by using a Python built-in function holidays. US( ) from holidays package. Outliers can be identified by statistical outlier detection techniques or based on predetermined thresholds on KPIs. The missing values may include "NA" and "NaN" values.

In one example of step of synthetic KPI generation, an operation generates certain sets of synthetic KPIs using the available KPIs. For example, the cumulative distribution of each KPI may be generated.

In one example of KPI selection based on domain knowledge, based on engineering domain knowledge, KPIs can be selected as features of the ML (particularly, the regression) models to be trained in the inference engine (506), which handles the processing tasks of the algorithms provided in the present disclosure. Domain-knowledge based feature selection methods are typically reliable since they depend on engineering physics but are very coarse if it is difficult to quantity the impacts of features. After this step is done, only the selected KPIs may be kept in the PM data.

A number of techniques have been provided in prior art, which are adapted in this work for application to the use cases above. For detecting shift in the empirical distribution of univariate variables, any of the well-known two-sample goodness-of-fit (GoF) tests may be employed. The Kolmogorov-Smirnov (KS) test, along with the Anderson-Darling (A-D) and Cramer-Von Mises (CVM) tests, compute functions relating to the "distance" between the empirical cumulative distribution function (ECDF) of two data samples. Each of the above tests the null hypothesis that two distributions P(x) and Q(z) are equivalent, where x and z are scalar quantities.

Figure 6:
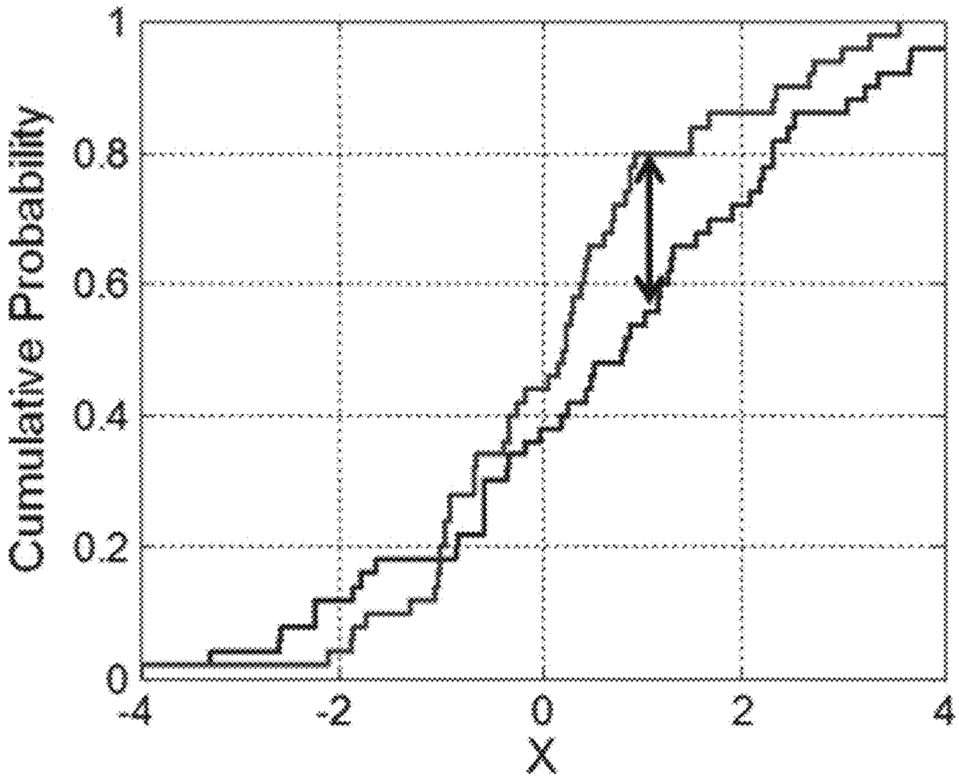
FIG. 6 illustrates an example of Kolmogorov-Smirnov Statistic according to embodiment of the present disclosure.

FIG. 6 illustrates an example of Kolmogorov-Smirnov statistic 600 according to embodiment of the present disclosure. An embodiment of the Kolmogorov-Smirnov statistic 600 shown in FIG. 6 is for illustration only.

Other information theoretic measures of the statistical similarity between two univariate or multivariate probability distributions are also available. For example, Jensen-Shannon (JS) Distance computes a function of the relative entropy between two distributions, which measures the information loss of approximating one distribution with the other. The Kullback-Leibler (KL) Divergence and mutual information (MI) are related measures of similarity between distributions but are not commonly used as distance metrics.

A number of methods have been provided for multivariate two-sample testing. In one example, a binary classifier model is trained to distinguish samples between two datasets $X=\{x_i|i=1 \ldots N^X\}$ and $Z=\{z_i|i=1 \ldots N^Z\}$, with each sample point $x_i$ and $z_i$ representing a vector of feature variables. In this work, it also refers to these sample sets as Group 1 for x samples and Group 2 for z samples. The approach to training the classifier, illustrated in FIG. 5, is to assign a label $y_i=1$ to $x_i$ sample points and $y_i=-1$ to $z_i$ sample points. The sets of pairs $\{<y_i=1,x_i>\}$ and $\{<y_i=-1, z_i>\}$ are then sub-sampled to generate separate training and test sets, which are concatenated together as $$U_{train} = \{\langle y_j, x_j\rangle | j \in I^X_{train}\} \cup \{\langle y_j, z_j\rangle | j \in I^Z_{train}\}, \text{ and}$$
$$U_{test} = \{\langle y_k, x_k\rangle | k \in I^X_{test}\} \cup \{\langle y_k, z_k\rangle | k \in I^Z_{test}\},$$

where the sets $$I^X_{train} \text{ and } I^Z_{train}$$

contain the training indices for samples of x and z and $$I^X_{test} \text{ and } I^Z_{test}$$

are the test indices for each respective sample. Note that the training and test sets may be mutually exclusive for proper training.

Figure 7:
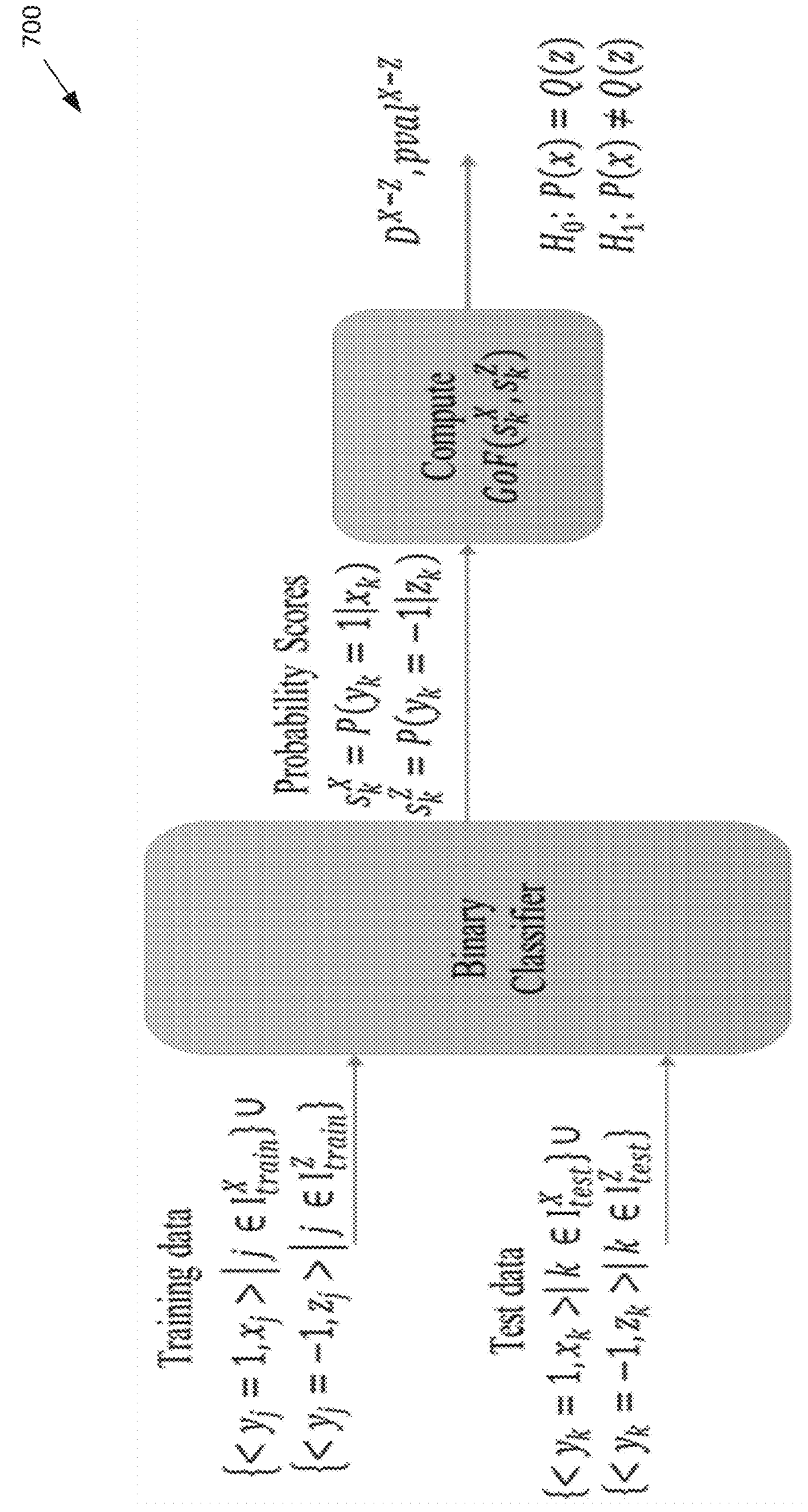
FIG. 7 illustrates an example of classifier-based multivariate two-sample test according to embodiment of the present disclosure.

FIG. 7 illustrates an example of classifier-based multivariate two-sample test 700 according to embodiment of the present disclosure. An embodiment of the classifier-based multivariate two-sample test 700 shown in FIG. 7 is for illustration only.

As shown in FIG. 7, a binary classifier is then trained using samples from the set $U_{train}$. Once trained, the model is used to compute a set of probability scores $$s^X_k = P(y_k = 1|x_k) \text{ and } s^Z_k = P(y_k = -1|z_k)$$

from the feature data of Group 1 test samples $x_k$ and Group 2 test samples $z_k$. The scores $$\{s^X_k\} \text{ and } \{s^Z_k\}, s^X_k, s^Z_k \in [0, 1]$$

can be thought of as probability distributions corresponding to each test sample. Thus, the empirical distributions of multivariate samples P(x) and Q(z) are summarized by these univariate scores, for which the null hypothesis can be tested using any of the univariate goodness-of-fit tests listed above.

For example, the KS test may be performed to test score sets $$\{s^X_k\} \text{ and } \{s^Z_k\}$$

and return a test statistic $D^{X-Z}$. The test statistic corresponds to a p-value $pval^{X-Z}$, which, in the case of the KS test, is computed from the Kolmogorov distribution. Similarly, the Anderson-Darling and CVM tests may output a test statistic and corresponding p-value. The null hypothesis is rejected if $pval^{X-Z}<conf$, where conf is a specified confidence level.

In many practical scenarios dealing with real-world data, it may be unlikely for two samples of data to be drawn from the same exact probability distribution. For example, due to the influence of many potential hidden variables, such as those mentioned earlier, the distribution of network data may drift over time. In such cases, the null hypothesis may be rejected based on the p-value returned by the two-sample tests, assuming sufficient sample sizes are provided.

However, it may still be useful to measure the amount of deviation between two empirical distributions, in addition to the evaluating the p-value, to assess the degree of dataset shift. The deviation of a dataset may also be measured relative to a reference dataset through generating a null distribution of test statistics by repeated sub-sampling of the Group 1 data and computing a test statistic between different pairs of sub-samples. The intuition for generating the null distribution of test statistics for Group 1 is that, as mentioned, when comparing a dataset Z with respect to a reference dataset X, some non-stationarity may be expected within the reference dataset X.

Even when selecting different sub-samples of X and performing a two-sample tests between the sub-samples, the null hypothesis may be rejected. Standard techniques may thus be too sensitive and result in a high false positive rate (FPR) As an example, if the goal is to measure dataset drift of new data Z from a time-series data stream compared to a historic dataset X, it is important to distinguish between (i) deviation due to sampling bias, e.g., sampling different time intervals from a data stream with seasonal trends, or (ii) due to drift in the underlying distributions of X and Z, the latter being the desired result. This is especially of concern when the sample size of Z may be small, which may be the case in many real-world applications such as anomaly detection, as decisions about potential anomaly events may be made quickly and, thus, the time to collect the new time series data points may limit limited.

Figure 8:
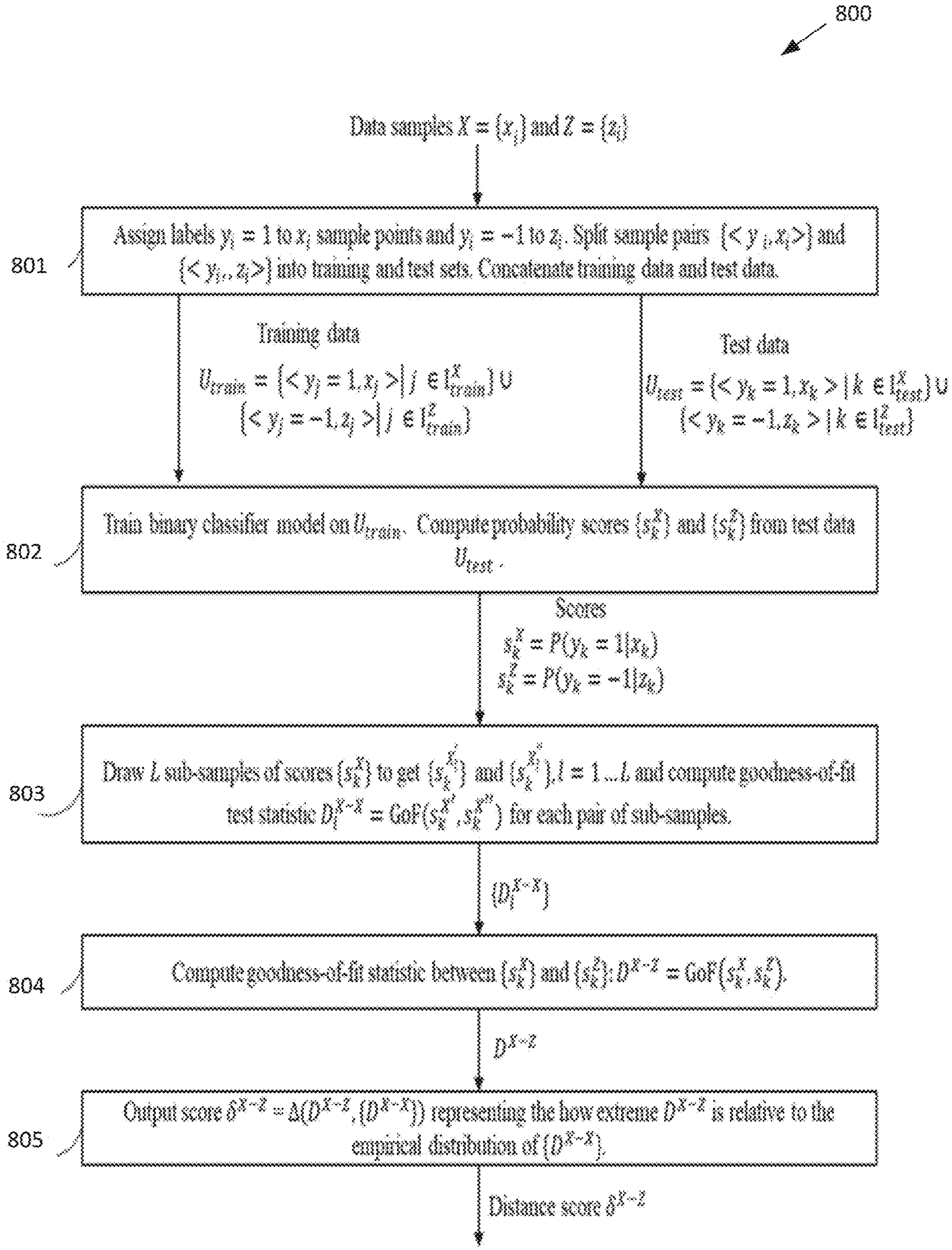
FIG. 8 illustrates a flowchart of a method for extension to classifier-based multivariate two-sample test according to embodiment of the present disclosure.

FIG. 8 illustrates a flowchart of a method 800 for extension to classifier-based multivariate two-sample test according to embodiment of the present disclosure. The method 800 as may be performed by a computing device (e.g., 104, 106, 116, and 200 as illustrated in FIG. 1, or the computing device can be implemented a network entity, network node, or a server in a network 102 as illustrated in FIG. 1). An embodiment of the method 800 shown in FIG. 8 is for illustration only. One or more of the components illustrated in FIG. 8 can be implemented in specialized circuitry configured to perform the noted functions or one or more of the components can be implemented by one or more processors executing instructions to perform the noted functions.

With this direction in mind, an extension of the classifier method is provided, which is illustrated in FIG. 8. In operation 803, the probability scores $$\{s_k^X\}$$

computed from the Group 1 test set are sub-sampled in operation, resulting in the sets $$\{k \in I_{test}^{X_l'}\} \text{ and } \{k \in I_{test}^{X_l''}\},$$

where $$I_{test}^{X_l'} \text{ and } I_{test}^{X_l''}$$

are mutually-exclusive sets of indices drawn from $$I_{test}^X.$$

Multiple different pairs of sets $$\{s_k^{X_l'}\} \text{ and } \{s_k^{X_l''}\}$$

for l=1 . . . . L are repeatedly drawn and the two-sample statistic is computed for each pair of samples to generate a null distribution of Group 1-to-1 statistics $$\{D_l^{X-X}\}.$$

Repeated sampling to obtain a distribution of sample statistics is known as bootstrapping. In the case of time-series data, instead of unordered, random sampling from the entire set of scores $$\{s_k^X\},$$

sample pairs may be drawn such that the timestamps of data corresponding to $$\{s_k^{X_l'}\}$$

all precede the timestamps of data for $$\{s_k^{X_l''}\}.$$

Thus, the two samples of each pair represent different time intervals.

Then, in operation 804, the statistic $D^{X-Z}$ is computed from $$\{s_k^X\} \text{ and } \{s_k^Z\}$$

and, in operation 805, may be compared to the Group 1-to-1 statistics $$\{D_l^{X-X}\}$$

by some function $$\Delta(D^{X-Z}, \{D_l^{X-X}\}),$$

which outputs a meta-score $\delta^{X-Z}$. Some example functions for $\Delta$ may include the percentile of $D^{X-Z}$ within $$\{D_l^{X-X}\},$$

computed as:

$$\Delta_{pctile}(D^{X-Z}, \{D_l^{X-X}\}) = 100\frac{\Sigma_l I(D^{X-Z} > D_l^{X-X})}{|\{D_l^{X-X}\}|}$$

where I(•) is the indicator function in the numerator and the denominator is the cardinality of $$\{D_l^{X-X}\}.$$

Alternatively, a Z-score function may be computed as:

$$\Delta_{z-score}(D^{X-Z}, \{D_l^{X-X}\}) = \frac{D^{X-Z} - \mu^{X-X}}{\sigma^{X-X}}$$

where $\mu^{X-X}$ is the mean and $\sigma^{X-X}$ are the standard deviation of $$\{D_l^{X-X}\}.$$

Other embodiments of the meta-scoring function may be considered as well, such as a simple ratio with the mean or median of $$\Delta_{mean}(D^{X-Z}, \{D_l^{X-X}\}) = \frac{D^{X-Z}}{\mu^{X-X}}$$

and $$\Delta_{median}(D^{X-Z}, \{D_l^{X-X}\}) = \frac{D^{X-Z}}{\text{median}(\{D_l^{X-X}\})}.$$

The key advantage of the scoring approach in method 800 compared to simply computing a p-value from a two-sample between Group 1 and 2 is that, by setting a threshold on the score relative to the Group 1-to-1 distribution $$\{D_l^{X-X}\},$$

the false positive rate can be deliberately controlled. The Group 1-to-1 scores $$\sigma^{X-X} = \Delta(D^{X-X}, \{D_l^{X-X}\})$$

can be used to determine a threshold for significant distribution shift by setting the threshold on the score $\sigma^{X-Z}$ to be the maximum or some other quantile of the set of $\{\sigma^{X-X}\}$. For example, by setting the threshold on $\sigma^{X-Z}$ to be the $90^{th}$ percentile of $\{\sigma^{X-X}\}$, the FPR is upper-bounded by 10%.

A second advantage for time series data is that, by sampling scores associated with different time intervals for $$\{s_k^{X_l'}\} \text{ and } \{s_k^{X_l''}\},$$

the resulting statistics $$\{D_l^{X-X}\}$$

capture the nominal dataset shift caused by normal, expected trends in the data.

Figure 9:
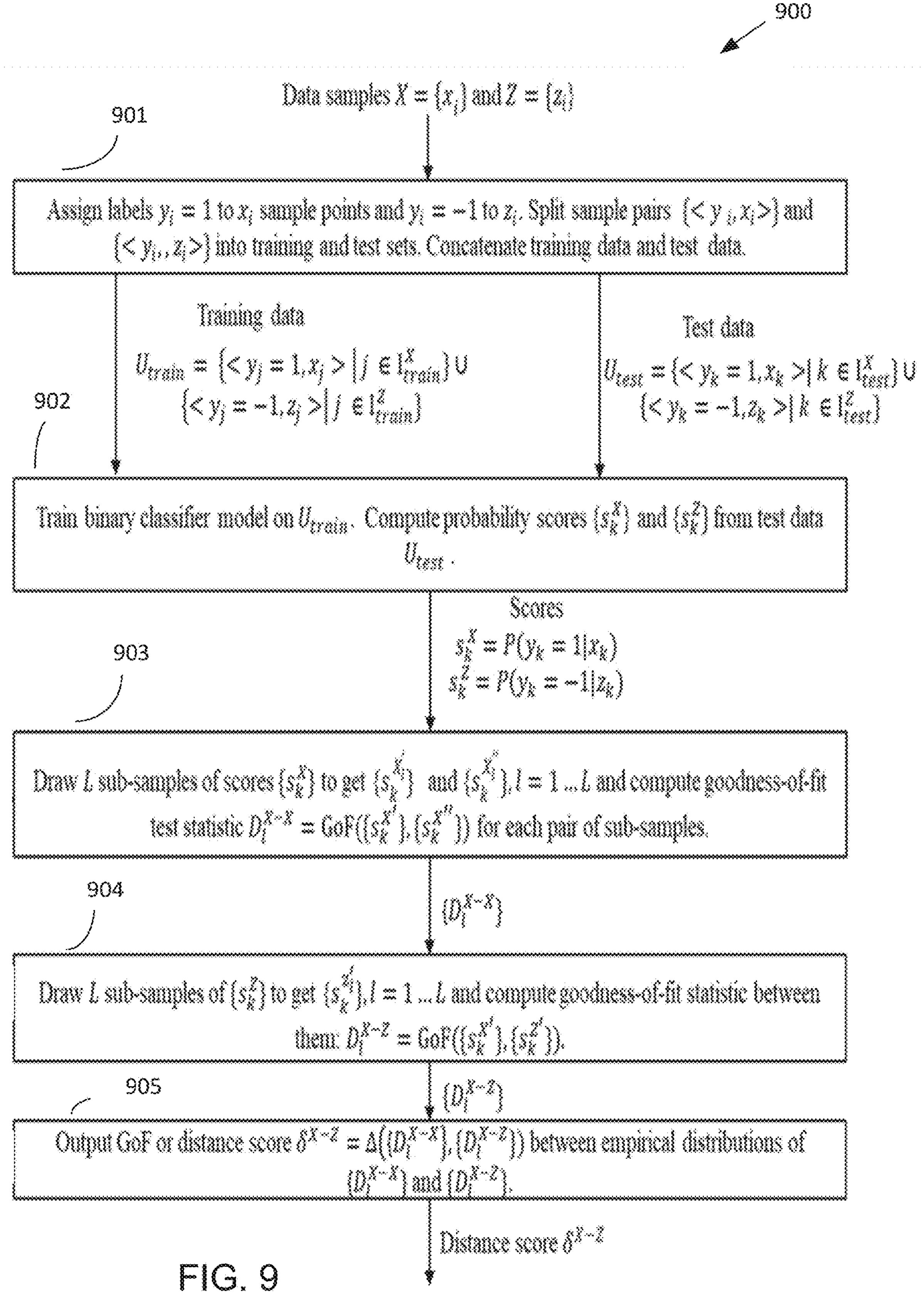
FIG. 9 illustrates a flowchart of a method for classifier according to embodiment of the present disclosure.

FIG. 9 illustrates a flowchart of a method 900 for classifier according to embodiment of the present disclosure. The method 900 as may be performed by a computing device (e.g., 104, 106, 116, and 200 as illustrated in FIG. 1, or the computing device can be implemented a network entity, network node, or a server in a network 102 as illustrated in FIG. 1). An embodiment of the method 900 shown in FIG. 9 is for illustration only. One or more of the components illustrated in FIG. 9 can be implemented in specialized circuitry configured to perform the noted functions or one or more of the components can be implemented by one or more processors executing instructions to perform the noted functions.

An alternative embodiment is shown in FIG. 9. Operations 901-903 follow from method 800 as illustrated in FIG. 8. In operation 904, sub-samples $$\{s_k^{Z_l'} \in I_{test}^{Z_l'}\}$$

are drawn from $$\{s_k^Z\}, \text{ where } I_{test}^{Z_l'} \subset I_{test}^Z.$$

Then, the distance between pairs of sub-samples $$\{s_k^{X_l'}\} \text{ and } \{s_k^{Z_l'}\}$$

may be evaluated by a GoF test, e.g., the KS or CVM test, to obtain Group 1-to-2 statistics $$\{D_l^{X-Z}\}.$$

Finally, in operation 705, the distribution of statistics $$\{D_l^{X-X}\} \text{ and } \{D_l^{X-Z}\}$$

may again be evaluated by a meta GoF test and the resulting p-value may be interpreted to check whether the null hypothesis holds. In this case, the score $\delta^{X-Z}$ may be the test statistic resulting from the GoF test in this step. Alternatively, an information-theoretic distance metric such as the JS distance may be used for the scoring function and used in place of the GoF test.

Another approach to multivariate dataset shift detection is to compute a multidimensional histogram of the two datasets being evaluated for equality, after which the count of sample points in each histogram bin may be compared to determine deviation between samples. The concept of a histogram is simple, but the details are in how the bin edges are determined. One histogram method provided in prior art is termed QuantTree. To briefly summarize the QuantTree algorithm using notation introduced in the present disclosure, a histogram h is first generated for Group 1 sample $X \in \mathbb{R}^M$, with samples of dimension M by recursively splitting the sample points into K bins, denoted $S_k$, k=1 . . . . K, where $\cup_k S_k = \mathbb{R}^M$. Once the histogram h has been fit to sample X, a test statistic $D_h(Z)$ is computed, which is a function of the number of data points in Group 2 sample Z falling into each bin $S_k$. The statistic $D_h(Z)$ is then compared to a threshold to determine if the null hypothesis holds and P(X)=Q(Z), or if it can be rejected. Two statistics are considered in the prior art, the first being the Pearson Statistic, written as:

$$D_h^P(Z) = \Sigma_{k=1}^K \frac{(N_k^Z - N^Z\pi_k)^2}{N^Z\pi_k}$$

where $N^Z$ is the number of data points in Z and $$N_k^Z$$

is the number of points of Z falling into histogram bin $S_k$.

The total variation statistic is also given as:

$$D_h^{TV}(Z) = \frac{1}{2}\Sigma_{k=1}^K |N_k^Z - N^Z\pi_k|$$

where |•| is the absolute value operation. Furthermore, one notable advantage of the QuantTree method is that the detection threshold can be computed to limit the false positive rate (FPR).

Similar to the provided use of the classifier method as a means of scoring the distance or deviation between two empirical distributions, in this disclosure an extension of the embodiments of the present disclosure is provided. In the provided system, the histogram-based statistic $D_h(Z)$ derived from the histogram h generated for sample X is used to compute a metric for the deviation between X and Z. Rather than simply comparing the histogram-based statistic $D_h(Z)$ to a threshold, the distance metric allows for comparison of relative differences between different samples Z and a reference sample X.

Figure 10:
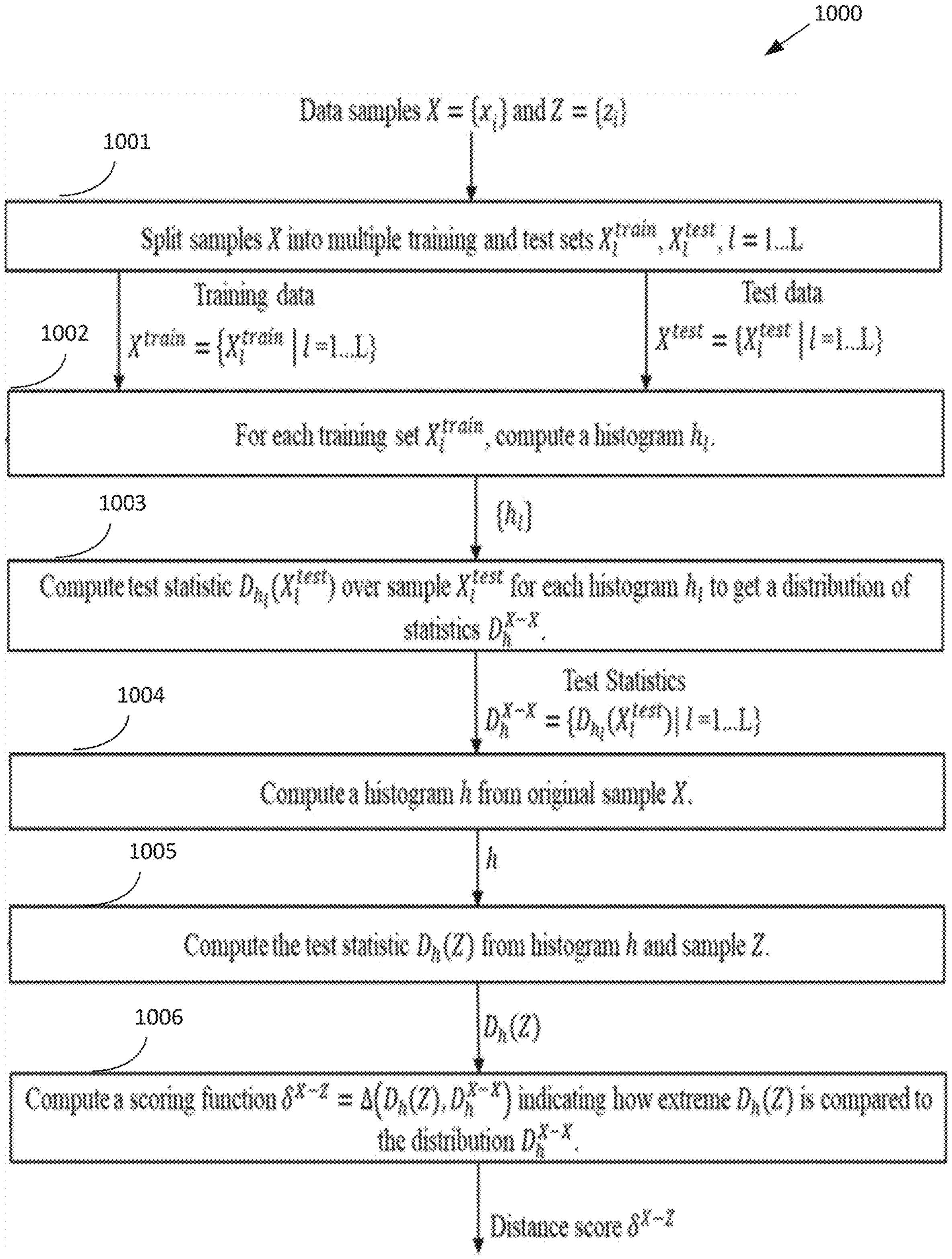
FIG. 10 illustrates a flowchart of a method for histogram-based dataset shift detection according to embodiment of the present disclosure.

FIG. 10 illustrates a flowchart of a method 1000 for histogram-based dataset shift detection according to embodiment of the present disclosure. The method 1000 as may be performed by a computing device (e.g., 104, 106, 116, and 200 as illustrated in FIG. 1, or the computing device can be implemented a network entity, network node, or a server in a network 102 as illustrated in FIG. 1). An embodiment of the method 1000 shown in FIG. 10 is for illustration only. One or more of the components illustrated in FIG. 10 can be implemented in specialized circuitry configured to perform the noted functions or one or more of the components can be implemented by one or more processors executing instructions to perform the noted functions.

In the procedure in FIG. 10, in operation 1001, sample X is first split into mutually-exclusive training and test sets $X^{train}$ and $X^{test}$ where $X^{train} \cap X^{test} = \emptyset$. These sets are further sub-sampled L times to generate set of $$X_l^{train} \text{ and } X_l^{test}$$

samples. In operation 1002, a histogram $h_l$ is computed for each of the $$X_l^{train}$$

samples and, in 1003, a test statistic $$T_{h_l}(X_l^{test})$$

is computed using the corresponding test data $$X_l^{test},$$

which yields a set of Group 1-to-1 statistics $$D_h^{X-X} = \{D_{h_l}(X_l^{test}) | l = 1 \ldots L\}.$$

In operation 1004, a histogram h is generated from sample X and the statistic $D_h(Z)$ is computed for sample Z in operation 1005. In operation 1006, the statistic $D_h(Z)$ is evaluated by a scoring function $$\Delta(D_h(Z), D_h^{X-X}),$$

which is a function of $D_h(Z)$ and the Group 1-to-1 statistics $$D_h^{X-X},$$

returning a score $\delta^{X-Z}$ indicating the distance between samples X and Z. The function $\Delta(\bullet)$ may one of the scoring function examples provided in the present disclosure.

As an alternative embodiment similar to method 900, in operation 1005, a set of test) statistics $$D_h^{X-Z} = \{D_{h_l}(Z_l^{test}) | l = 1 \ldots L\}$$

may be computed using the histograms $h_l$ generated for each sub-sample $$X_l^{train}.$$

Then, the distribution $$D_h^{X-Z}$$

may be evaluated with respect to $$D_h^{X-X}$$

by means of a goodness-of-fit test or by computing an information-theoretic metric between the two empirical distributions. The GoF test may return a p-value, which can be evaluated for hypothesis testing.

Anomaly detection techniques involve identifying deviations from the expected data distribution. Still, due to seasonal trends, configuration changes and other exogenous (external) factors, changes in the distribution are sometimes anticipated. Therefore, when classifying data points as anomalies, it is important to compare the new time-series data samples to historic samples which are generated under similar network conditions to the new samples. In other words, the historic data may first be grouped based on known conditions which influence the data stationarity, so that the data within each group is stationary (though, in practice, it may not be possible to ensure perfect stationarity of each group).

The objective of context-based grouping prior to performing AD is thus to control for different external factors, which may yield changes in the data distribution that could confound standard AD techniques. The network conditions that characterize the data in each group may be called the context of the data. The methods of context-based anomaly detection provided in this work thus involve comparing new data of the same or similar context when detecting abnormal behavior.

Figure 11:
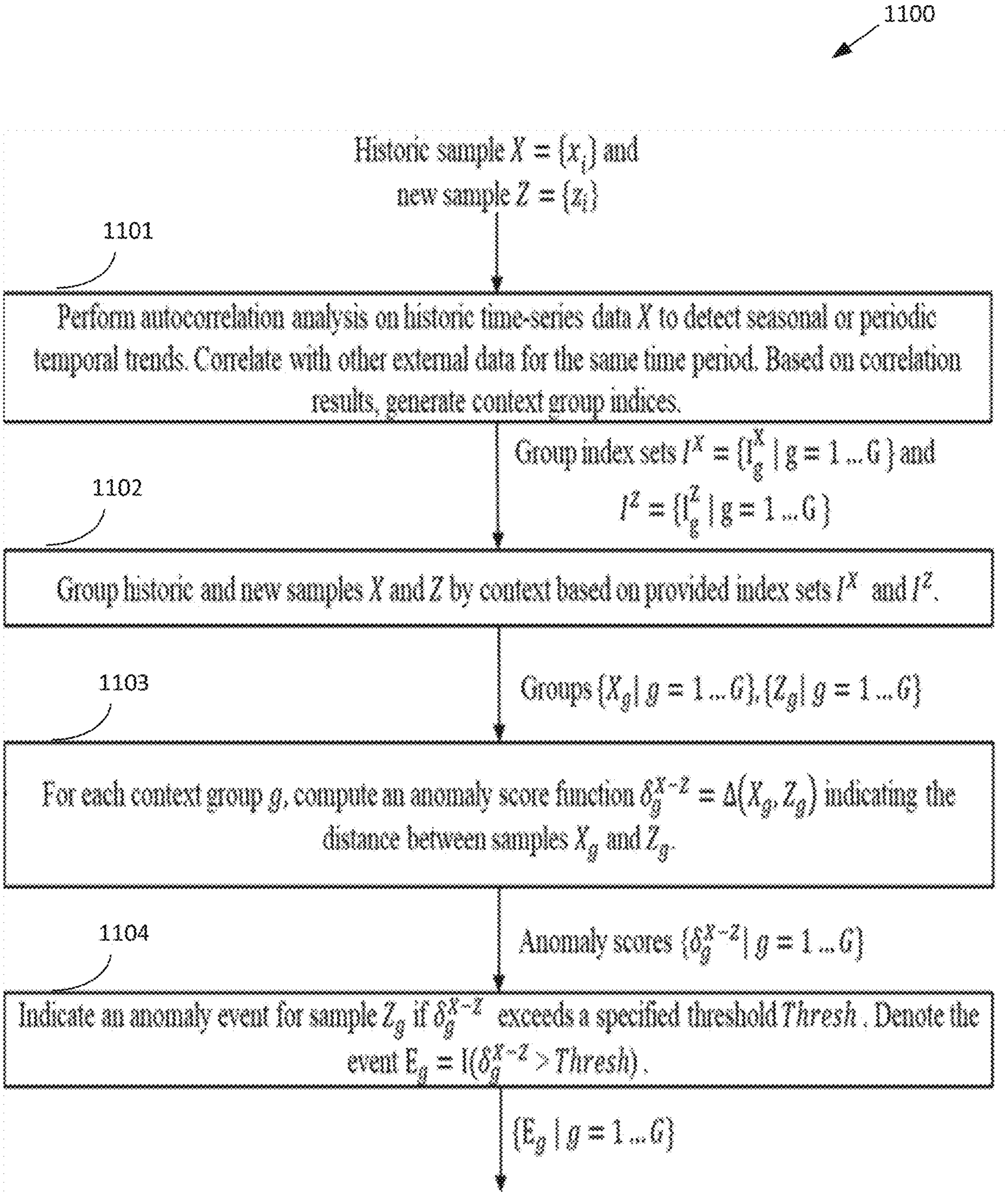
FIG. 11 illustrates a flowchart of a method for context-based anomaly detection according to embodiment of the present disclosure.

FIG. 11 illustrates a flowchart of a method 1100 for context-based anomaly detection according to embodiment of the present disclosure. The method 1100 as may be performed by a computing device (e.g., 104, 106, 116, and 200 as illustrated in FIG. 1, or the computing device can be implemented a network entity, network node, or a server in a network 102 as illustrated in FIG. 1). An embodiment of the method 1100 shown in FIG. 11 is for illustration only. One or more of the components illustrated in FIG. 11 can be implemented in specialized circuitry configured to perform the noted functions or one or more of the components can be implemented by one or more processors executing instructions to perform the noted functions.

One embodiment of the provided context-based AD system illustrated in FIG. 11. Initially, data points for historic samples X and new samples being tested Z are collected. The historic data may be obtained from a database, like element (e.g., database 306) in FIG. 3, or other data source, while batches of new sample data may be obtained from a database or streamed directly from the network devices or aggregation point. In operation 1101, data points for X and Z are grouped by context. The context may be determined based on a number of factors.

Some examples contexts, which may exhibit different data distributions in networks are as follows: (1) configuration settings: different configuration settings for devices may result in differing behavior and, in turn, different data distributions; (2) temporal context: a periodic interval of time, such as summer vs. winter, day of week, hour of day, weekend vs. weekday, or specific holiday; (3) weather conditions, e.g., rain vs. no rain; (4) occurrence of a special event, such a sporting event, farmers market or street fair; and/or (5) special content, such as a streaming video, television program or podcast, being available at specific periodic or aperiodic times, which may impact traffic demand.

As a step prior to context grouping, in operation 1101, the operator may first analyze the data by correlating trends in feature variables with potential context variables. As an example, for identifying temporal contexts, an autocorrelation analysis can be performed by delaying the data by some number of time steps and computing a correlation function between the original time-series data and the delayed version. The well-known formula for autocorrelation of a scalar discrete-time signal of length T is written as follows:

$$R_{xx}(\tau) = \sum_{t}^{T} x(t)x(t-\tau).$$

An example illustration of a random time-series x with samples denoted x(t) and its autocorrelation at different lags τ is shown in FIG. 11. Each random variable x(t) is generated by modulating a sine wave with a periodicity of 100 time steps by a series of normally-distributed random variables. This periodicity represents a seasonal trend, such as a daily variation in traffic, which is often observed in network data. As expected, the strong positive peaks in the autocorrelation plot are observed at lags τ=100k, k=0, 1, 2, 3, 4 time steps matching the period of the modulated signal, whereas a strong negative correlation is observed at lags τ=100k+50.

Figure 12:
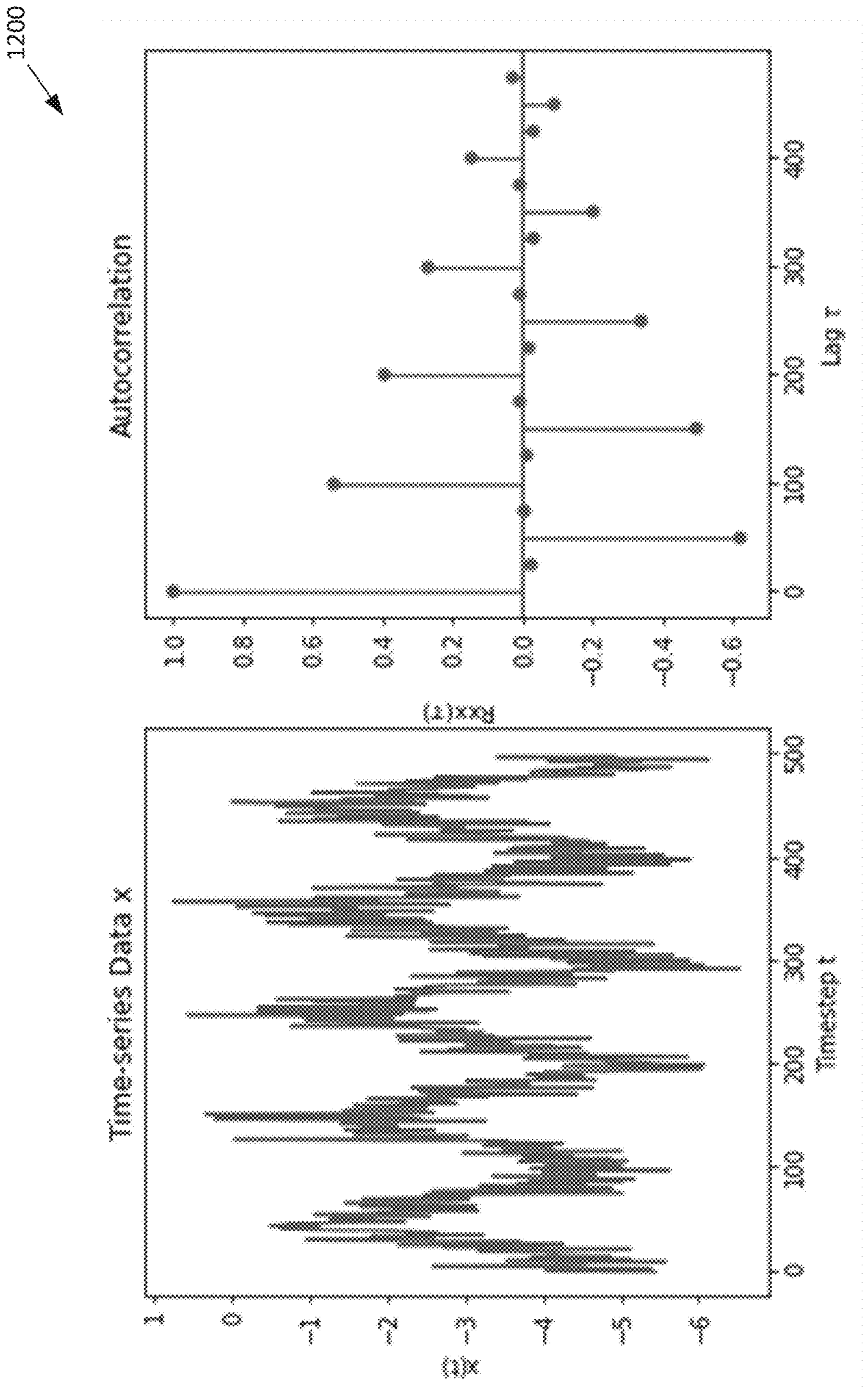
FIG. 12 illustrates an example of autocorrelation of time-series data with periodic component according to embodiments of the present disclosure.

FIG. 12 illustrates an example of autocorrelation of time-series data with periodic component 1200 according to embodiments of the present disclosure. An embodiment of the autocorrelation of time-series data with periodic component 1200 shown in FIG. 12 is for illustration only.

As another example, one may analyze whether reduced traffic demand is correlated with the occurrence of rain during particular time periods. In this case, the standard time correlation formula may be applied, written as:

$$R_{xy}(\tau) = \sum_{t}^{T} x(t)y(t-\tau)$$

where y(t) represents an exogenous time-series variable, such as the amount of rain falling in the geographic area of the network devices generating the data x. In both cases of time correlation and autocorrelation, the general approach is to find peaks of high correlation at specific lag points. The points of high correlation may then instruct how to partition the data into context groups, as previously described. Furthermore, deep-dive analysis into PM data, alarms, logs and configuration data may also be performed for cellular base stations and other devices in the network for the operator to understand different exogenous variables and their impact, in order to group data points by context.

Once the desired context variables are determined, the indices for each context group are calculated and the samples X and Z are partitioned into G distinct subsets denoted $X_g$ and $Z_g$ in 1102. Then, in operation 1103, a function $\Delta(X_g, Z_g)$ is computed between the sample subsets. The function may be based on the multivariate goodness-of-fit statistic or p-value, statistic from the QuantTree or other histogram-based method, or information theoretic metric, such as described in the present disclosure.

Additionally, the provided methods 900 or 1000 may be applied to generate a set of test statistics $$\{D_{g,l}^{X-X}\} \text{ and } \{D_{g,l}^{X-Z}\}, l = 1 \ldots L$$

for each group by repeated sub-sampling of $X_g$ and $Z_g$ L times. A scoring function $$\Delta(\{D_{g,l}^{X-X}\}, \{D_{g,l}^{X-Z}\})$$

may then be computed by one of the provided functions in the present disclosure, or by a similar function, which computes an anomaly score indicating the deviation between samples $X_g$ and $Z_g$. In operation 1104, the anomaly score $$\delta_g^{X-Z}$$

output from the scoring function may be compared against a threshold Thresh to indicate whether sample $Z_g$ for context group g is abnormal or not. An anomaly event $E_g$ is indicated if an anomaly is indicated for sample $Z_g$, with $E_g=1$ indicating an anomaly event and $E_g=0$ indicating no anomaly event. Furthermore, if multiple anomalies are indicated for context groups that correspond to successive time intervals, this information may also be provided to the operator, which may help diagnosing a persistent problem or fault with the network. An aggregate anomaly score may be computed from successive anomaly scores or anomaly event indications, for example by taking the mean of the anomaly scores $$\delta_g^{X-Z}$$

or anomaly event indicators for the T most recent values of $E_g$.

Operators may often change configuration parameter settings in the network for purposes of performance improvement, trialing new features, resolving faults or failures, when deploying new devices and so forth. These changes to the network configuration may result in shift of the PM or other data distribution. For instance, changes to uplink (UL) power control parameters of LTE or 5G cellular BSs impact the distribution of signal power received from UE devices, which, in turn, impacts uplink capacity and throughput, along with numerous other aspects of the cellular network. Furthermore, different network devices, e.g., cellular base stations, may be impacted differently by the same configuration settings.

Some devices may experience a positive performance improvement or a negative degradation, despite having the same settings. For example, some cells in dense urban environments may see performance improvement, whereas rural cells near highways may experience degraded KPIs given the exact same settings. Such results can be confusing to interpret by network engineers, who may then need to investigate why certain cells did not show the expected improve. In this disclosure, methods are provided to characterize or profile the types of devices and their respective datasets toward understanding performance impact of configuration changes.

Figure 13:
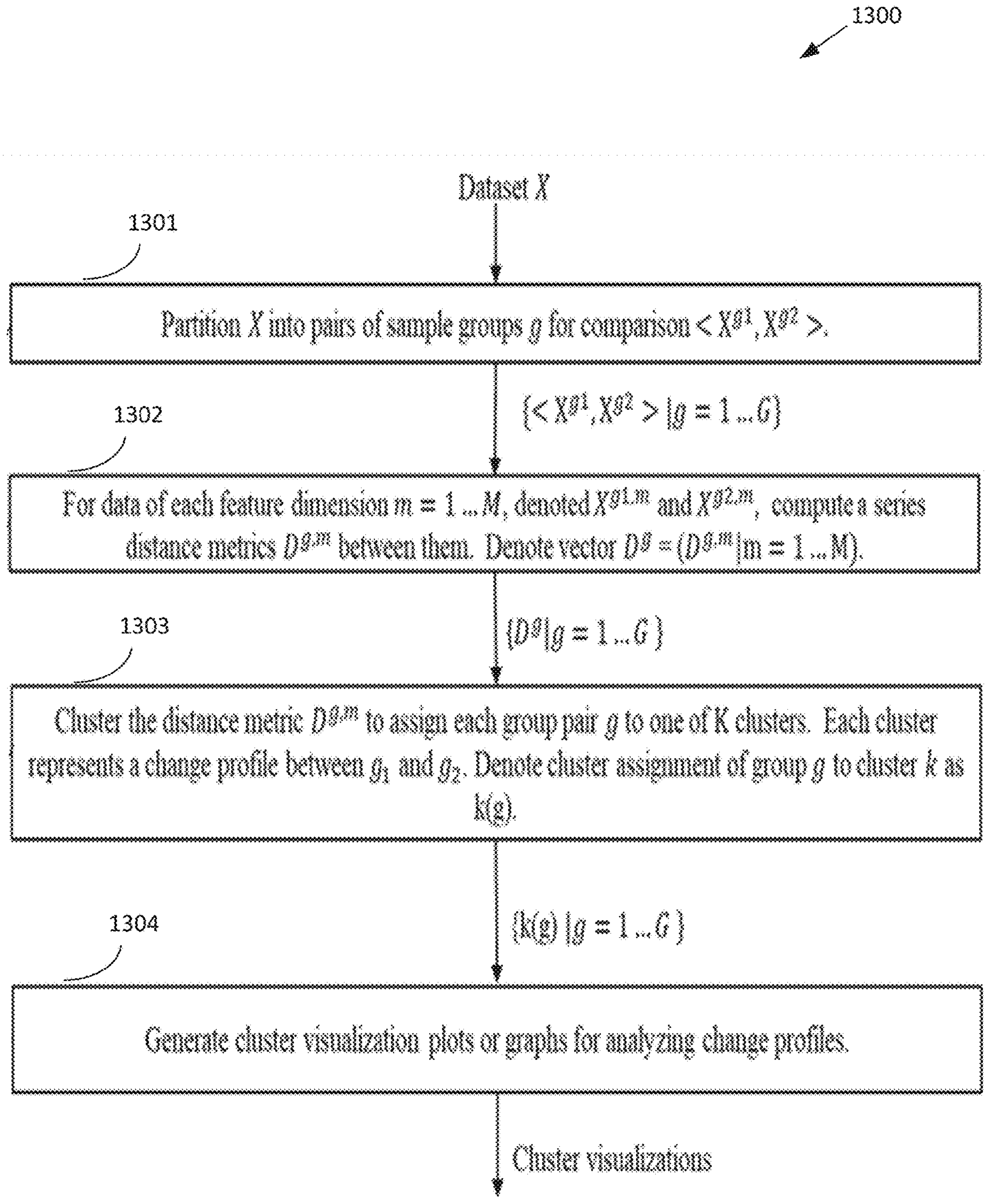
FIG. 13 illustrates a flowchart of a method for profiling performance impact of configuration changes according to embodiment of the present disclosure.

FIG. 13 illustrates a flowchart of a method 1300 for profiling performance impact of configuration changes according to embodiment of the present disclosure. The method 1300 as may be performed by a computing device (e.g., 104, 106, 116, and 200 as illustrated in FIG. 1, or the computing device can be implemented a network entity, network node, or a server in a network 102 as illustrated in FIG. 1). An embodiment of the method 1300 shown in FIG. 13 is for illustration only. One or more of the components illustrated in FIG. 13 can be implemented in specialized circuitry configured to perform the noted functions or one or more of the components can be implemented by one or more processors executing instructions to perform the noted functions.

FIG. 13 shows the general procedure for performing cluster analysis on a set of test statistics computed between pairs of samples. In operation 1301, dataset X is partitioned into pairs of sample groups g, denoted $<X^{g1},X^{g2}>$. Each sample group $X^{g1}$ and $X^{g2}$ may be associated with a particular pre- and post-change combination of parameter settings for a specific network device. Thus, the goal of comparing a pair of groups is to analyze the distribution shift resulting from a parameter change and identify devices with similar KPI feature impact resulting from such changes.

However, alternate use cases can be conceived besides parameter change analysis, such as analyzing differences between any of the context groups considered earlier in the present disclosure. In operation 1302, sets of distance metrics are computed between the m individual features of each pair $X^{g1},X^{g2}$, which are written $D^{g,m}$. The function for calculating the distance metric may be based on any of the univariate metrics in the present disclosure. The vector of distance metrics for group pair g is then denoted $D^g=(D^{g,m}|m=1 \ldots M)$.

In one embodiment, dimensionality reduction may be performed to reduce number dimensions of statistics $D^g$ from M to M', resulting in vector $$D^g_{red}.$$

The well-known principal component analysis (PCA) or Kernel PCA may be employed in this step, as well as more recent techniques such as self-organizing maps (SOM) and t-SNE.

Alternatively, in another embodiment, a decision tree classifier, random forest classifier or other model is employed, which can rank feature importance based on the relevance of each feature to the classification decision probabilities. The model is trained to classify the $X^{g1}$ feature data as belonging to one class and $X^{g2}$ feature data to another class. Then, the top M' features are selected with the highest importance to be included in the reduced set of statistics $$D^g_{red}.$$

Different embodiments may be considered with different combinations of the aforementioned dimensionality reduction techniques.

As a further embodiment, the range of data $$D^{g,m}_{red}$$

along each dimension m may be quantized into B discrete bins, resulting in a vector $$D^g_{quant} = (D^{g,b}|b = 1 \ldots B).$$

Then, in operation 1303, the distance vectors for each group pair $D^g$, or the reduced-dimensionality or quantized versions $$D^g_{red} \text{ or } D^g_{quant},$$

are clustered into K clusters representing different profiles of distribution shift between the pairs of groups. Any of the well-known clustering methods may be used, such as K-means clustering, agglomerative clustering or DBSCAN.

Multiple separate clusterings may be computed individually for group pairs $X^{1,g},X^{2,g}$ from different network devices having the same type of parameter changes. In other words, different devices with the same parameter changes may be analyzed and clustered to identify cells with similar parameter change impact. Alternatively, multiple devices with different CM changes may be clustered to analyze the differences between different changes. Lastly, in operation 1504, the resulting cluster or clusters may be visualized, for example, with a 2D or 3D cluster plot, or "radar" plots for each individual cluster showing the median, mean or other summary statistic of each component dimension of the clustered data.

In another embodiment, following the clustering in operation 1303, clusters may be analyzed in terms of which features contribute most to the cluster formation, that is, which KPI distributions are more distinctly different between clusters and thus were impacted differently by the configuration change. The empirical distributions of the differently-impacted KPIs per each cluster can then be analyzed and visualized in step 1304, as may be demonstrated in the present disclosure.

A procedure for identifying such relevant KPIs is as follows: (1) scale the cluster distances per each feature $D^{g,m}$ to the range [0,1] using max-min scaling. For convenience, the scaled distances may also be denoted $D^{g,m}$; (2) for each unique pair of clusters $$C_1 = \{D^g_{c=1} \mid g = 1 \ldots G\} \text{ and } C_2 = \{D^g_{c=2}\},$$

where $$D^g_c$$

denotes the set of distance metrics with cluster label c, compute a distance between each scaled feature statistic $$D^{g,m}_1 \text{ and } D^{g,m}_1.$$

For example, the following distance function may be used:

$$Dist^m_{1-2} = \text{abs}(\text{mean}(\{D^{g,m}_1\}) - \text{mean}(\{D^{g,m}_2\}));$$

and (3) sort the distances $$Dist^m_{1-2}$$

and select the L features corresponding to the greatest distances as the relevant features. Alternatively, select all features above a threshold. Note that, thanks to max-min scaling, the threshold may also be in the range [0,1].

This information is useful when analyzing impact of CM change, for instance, when trialing new parameter settings in the field in order to improve one or more target KPIs. It may be the case that the same type of CM change impacts some cells differently than expected, possibly causing degradation when improvement was the goal. In such cases, it is helpful to look at other symptomatic KPIs, along with the target KPIs, that show different patterns of dataset shift. For example, if the target KPI being optimized is IP-layer throughput, if the same CM change results in improvement for 90% of cells but degradation for the remaining 10%, it is possible that symptomatic KPIs such as SINR and Block Error Rate metrics show different patterns in their distributions. Additionally, other metrics such as the percent change between the KPI values from Group 1 to Group 2 within each cluster may be computed to analyze the direction of KPI shift, i.e., whether improvement or degradation occurred.

Finally, as a further embodiment, instead of clustering the distance between empirical distributions $D^g$, the ratio, difference, percent change or other function indicating a change in the per-feature data may be clustered. As an example, the percent change may be computed as follows:

$$\text{pct} - \text{change}(X^{1,m}, X^{2,m}) = \frac{\text{mean}(X^{2,m}) - \text{mean}(X^{1,m})}{\text{mean}(X^{1,m})}.$$

In the above, $X^{1,m}$ and $X^{2,m}$ are the pairs of Group 1 and Group 2 samples of feature m corresponding to a given CM change. The percent change may be a function of the means, medians or other summary statistics of the feature data.

Over time, the accumulation of changes to the network and environment can result in large differences between the original dataset, with which an ML or other analytical model is trained, and new input data, which is used by the model to generate new inferences. As a consequence, the model, which may initially perform well, may lose performance (measured by overall classification accuracy, cross-entropy, F1 score, R-squared, mean absolute error, mean squared error, mean percentage error, or other metric) over time as the underlying statistics of the data stream drift from the historical statistics captured by the model.

For many predictive models, it is therefore necessary to re-train the model with updated data after a period of time. Furthermore, it may not be practical in some circumstances to gather additional ground truth data for the target predicted variable y to test the model for performance loss. The model may predict a target variable, which is not actively measured in the field but for which training data was previously gathered for model development. As an example, a model may be trained using PM data to predict voice call quality measured by a service-level quality indicator, such as a user MOS score. MOS scores may be collected from users and, typically, are not quantities that are automatically reported by the network.

Therefore, such ground truth data is not available in the field. In other cases, many new samples of the target variable may need to be gathered before it may be determined that re-training is required, which may result in prolonged periods of degraded accuracy. In this work, methods for detecting dataset shift are provided, which may identify when it has become necessary to re-train the model. The methods are useful when the only covariate (feature) data is available but are also applicable when the target data is available, as well.

Consider the problem of predicting a time-series variable y from input feature data X by a function $f(\bullet)$, written as: $\hat{y}=f(X)$ where $\hat{y}$ is the output prediction of y given X. Function $f(\bullet)$ may be a classifier and predict a discrete label y or may be a regression model, in which case y is real-valued. In the context of supervised learning, the functional model $f(\bullet)$ is trained given a set of training examples $S_{train}=\{<y_i,X_i>|i\in I_{train}\}$ for training indices $I_{train}$ and, once trained, the model performance is tested on a held-out set of data $S_{test}=\{<y_i,X_i>|i\in I_{test}\}$ for test indices $I_{test}$. For time series data, the initial model may be trained and tested to perform well for an initial set of historic training and test data, denoted $$S^0_{train} \text{ and } S^0_{test},$$

respectively. Taking regression as an example, the initial model coefficient of determination $R^2$ may provide an acceptable level of error (e.g., $R^2>0.7$). It denotes that the initial training and test samples $$S^0_{train} \text{ and } S^0_{test}$$

and the initial test $R^2$ as $$R^{2_0}_{test}.$$

However, after some time has passed, the underlying data distribution of the feature or target data may have changed so that if the $R^2$ were computed for a future sample $$S^g = \{\langle y_i^g, X_i^g \rangle\},$$

the resulting predictions $$\hat{y}_i^g$$

may yield an $$R^{2_g}_{test}$$

that is less than the original score $$R^{2_0}_{test}.$$

In other words, the model no longer accurately captures the relationship between the time series X and y, either due to covariate shift in X, prior shift to y, or concept shift, i.e., a change in the conditional probability P(y|X). Furthermore, for successive future samples $S^{g=1}$, $S^2$, $S^3$ . . . , the accuracy may be expected to gradually decrease, i.e., $$R^{2_{g=1}}_{test} > R^{2_2}_{test} > R^{2_3}_{test} > \ldots .$$

As it may not be practical to continually re-train the model with new data, the user may wish to wait until the performance has decrease below an acceptable threshold, i.e., $$R^{2_g}_{test} < \text{Thresh}_{Re-train}.$$

Figure 15:
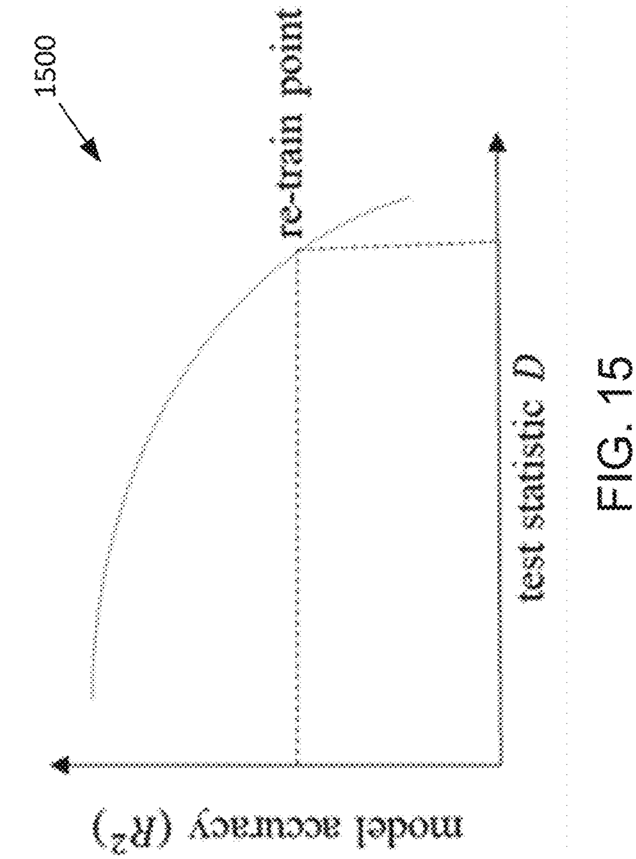
FIG. 15 illustrates an example of correlation between model accuracy on new data and a test statistic according to embodiments of the present disclosure.

It may be convenient if the user could easily compute a metric of the covariate shift between $$X_i^0 \text{ and } X_i^g$$

to indicate when re-training of the model is required, as exemplified in FIG. 15. Toward this general goal, several approaches are provided in the following.

Figure 14:
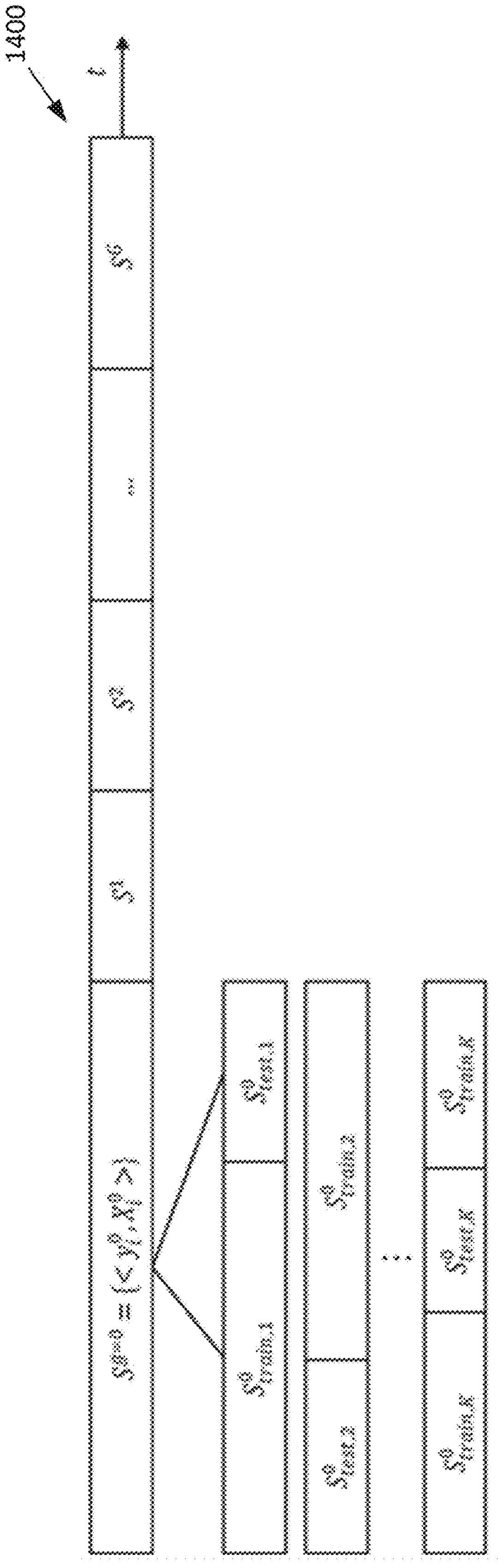
FIG. 14 illustrates an example of segmentation of training and test data for different time periods according to embodiments of the present disclosure.

FIG. 14 illustrates an example of segmentation of training and test data for different time periods 1400 according to embodiments of the present disclosure. An embodiment of the segmentation of training and test data for different time periods 1400 shown in FIG. 14 is for illustration only.

FIG. 15 illustrates an example of correlation between model accuracy on new data and a test statistic 1500 according to embodiments of the present disclosure. An embodiment of the correlation between model accuracy on new data and a test statistic 1500 shown in FIG. 15 is for illustration only.

Figure 16:
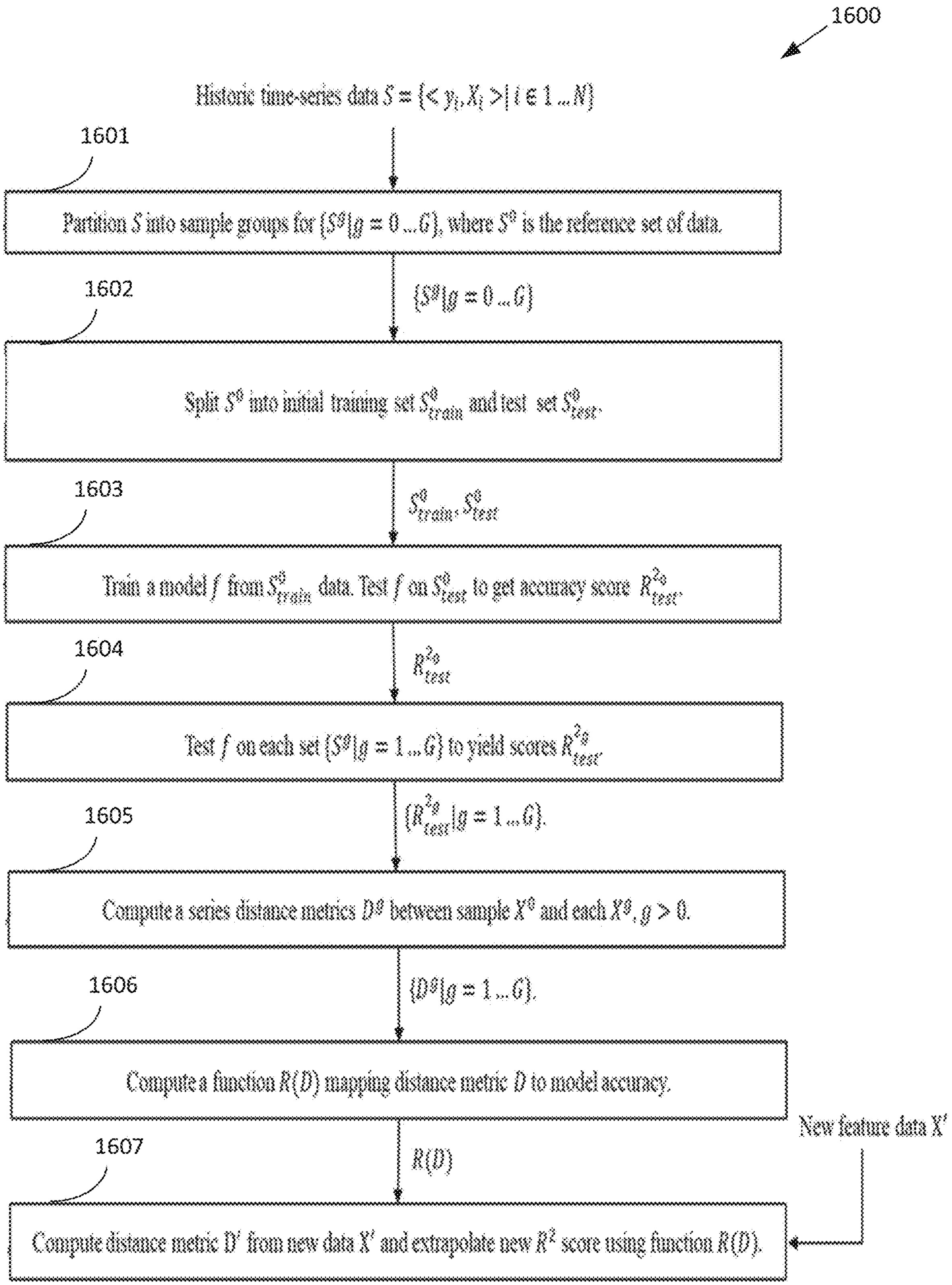
FIG. 16 illustrates a flowchart of a method for modeling performance loss curve as a function of dataset Shift according to embodiment of the present disclosure.

FIG. 16 illustrates a flowchart of a method 1600 for modeling performance loss curve as a function of dataset Shift according to embodiment of the present disclosure. The method 1600 as may be performed by a computing device (e.g., 104, 106, 116, and 200 as illustrated in FIG. 1, or the computing device can be implemented a network entity, network node, or a server in a network 102 as illustrated in FIG. 1). An embodiment of the method 1600 shown in FIG. 16 is for illustration only. One or more of the components illustrated in FIG. 16 can be implemented in specialized circuitry configured to perform the noted functions or one or more of the components can be implemented by one or more processors executing instructions to perform the noted functions.

One embodiment is shown in FIG. 16. In operation 1601, a set of collected time-series data $S=\{<y_i,X_i>|i\in 1 \ldots . N\}$ is partitioned into a series of sub-samples for successive time intervals g, with samples $\{S^g|g=0 \ldots . G\}$, such that the timestamps of data in $S^g$ are greater than the timestamps in $S^{g+1}$, which are greater than the timestamps of $S^{g+2}$, and so forth. The initial sample $S^0$ may be selected to have a much larger set of historic sample points than sets for g>0. For example, given 12 months of historic data, the first 6 months may be assigned to $S^0$, with single months assigned to $S^1$, $S^2$ and so on. Then, in operation 1602, $S^0$ is segmented into initial training set $$S^0_{train}$$

and test set $$S^0_{test}.$$

In operation 1603, a model $f$ is trained from $$S^0_{train}$$

and tested on $$S^0_{test},$$

resulting in an initial $R^2$ score of $$R^{2_o}_{test}.$$

Alternatively, K-fold cross validation may be performed in 1602 and 1603 over K sample splits, producing training and test samples $$S^0_{train,k} \text{ and } S^0_{test,k},\ k = 1 \ldots K,$$

with corresponding $$\{R^{2o}_{test,k}\}.$$

In this case, the mean, median, Mth-percentile or other function of the set of scores $$\{R^{2o}_{test,k}\}$$

from each split may be taken and simply denoted $$R^{2o}_{test}.$$

Next, in operation 1604, the target variable is predicted by $f$ for each group $S^g$, g>0, which yields a series of $R^2$ scores $$\{R^{2g}_{test} \mid g = 1 \ldots G\}.$$

In operation 1605, measure the shift between the empirical distributions of the feature data of the initial training sample $$X^0_{train},$$

corresponding to $$S^0_{train},$$

and each successive sample $X^g$, g>0 by means of one of the multivariate two-sample GoF test statistics, p-values, or information-theoretic metrics provided in the present disclosure.

This results in a series of test statistics $D^g$. In operation 1606, a regression curve R(D) is fit to map the test statistic of each successive sample $D_g$ to the expected test $R^2$. The curve fitting in 1606 may be performed by any of the well-known regression methods, such as polynomial regression. In operation 1607, the function R(D) may be used to estimate the degradation in accuracy for future samples of feature data X'. As another embodiment, the ratio of each $$R^{2g}_{test}$$

with the initial $$R^{20}_{test}$$

may be taken, and a function computed to map the test statistic D to this ratio. Note that the procedure just described also applies for other model performance metrics instead of $R^2$, such as cross-entropy in the case of classification models. Note also that the function R(D) may be trained using data from a single network device, e.g., a cellular base station, or multiple network devices by aggregating their data.

Figure 17A:
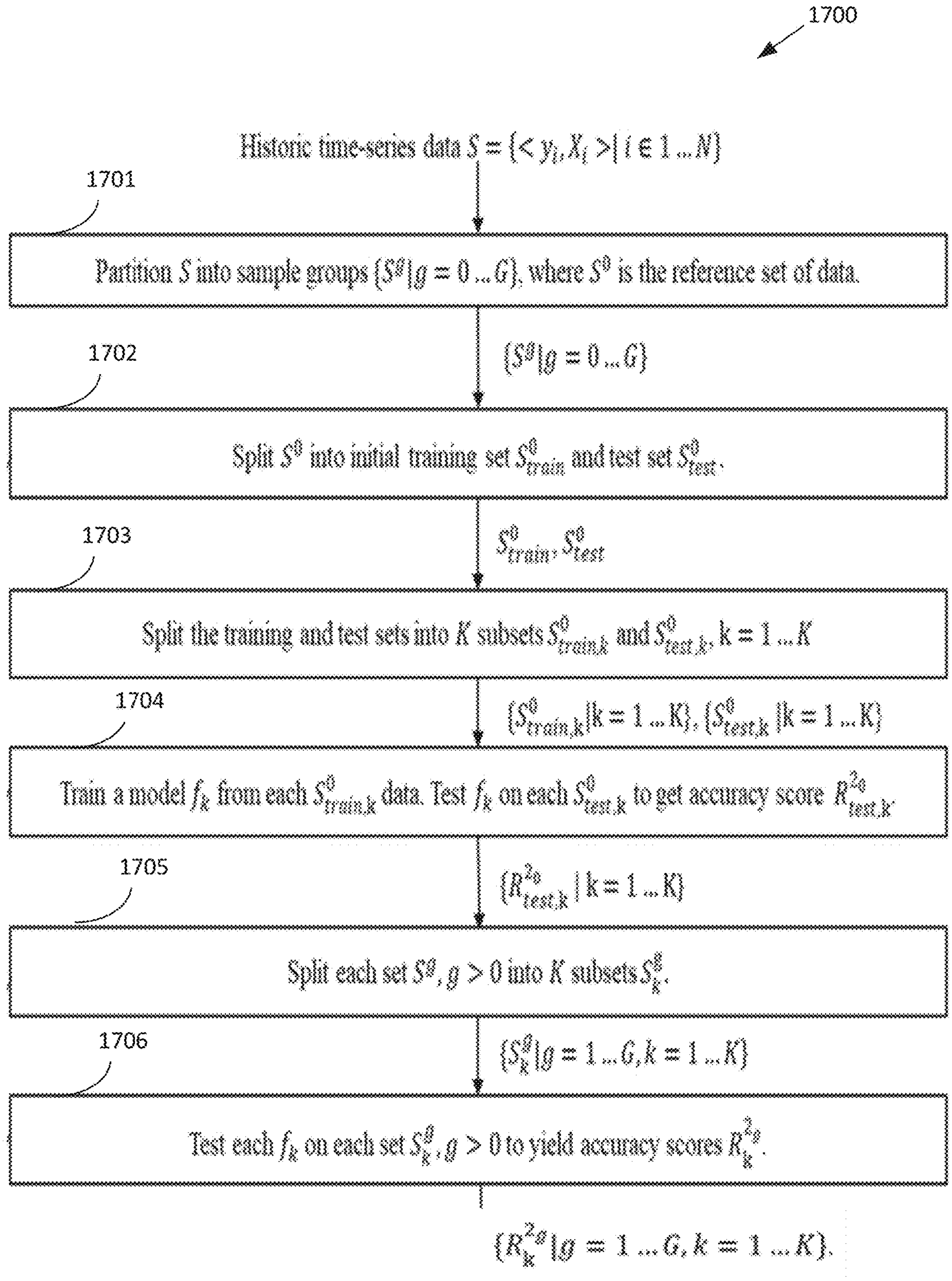
FIG. 17A illustrates a flowchart of a method for predicting performance loss from changes in feature distributions according to embodiment of the present disclosure.

FIG. 17A illustrates a flowchart of a method 1700 for predicting performance loss from changes in feature distributions according to embodiment of the present disclosure. The method 1700 as may be performed by a computing device (e.g., 104, 106, 116, and 200 as illustrated in FIG. 1, or the computing device can be implemented a network entity, network node, or a server in a network 102 as illustrated in FIG. 1). An embodiment of the method 1700 shown in FIG. 17A is for illustration only. One or more of the components illustrated in FIG. 17A can be implemented in specialized circuitry configured to perform the noted functions or one or more of the components can be implemented by one or more processors executing instructions to perform the noted functions.

Figure 17B:
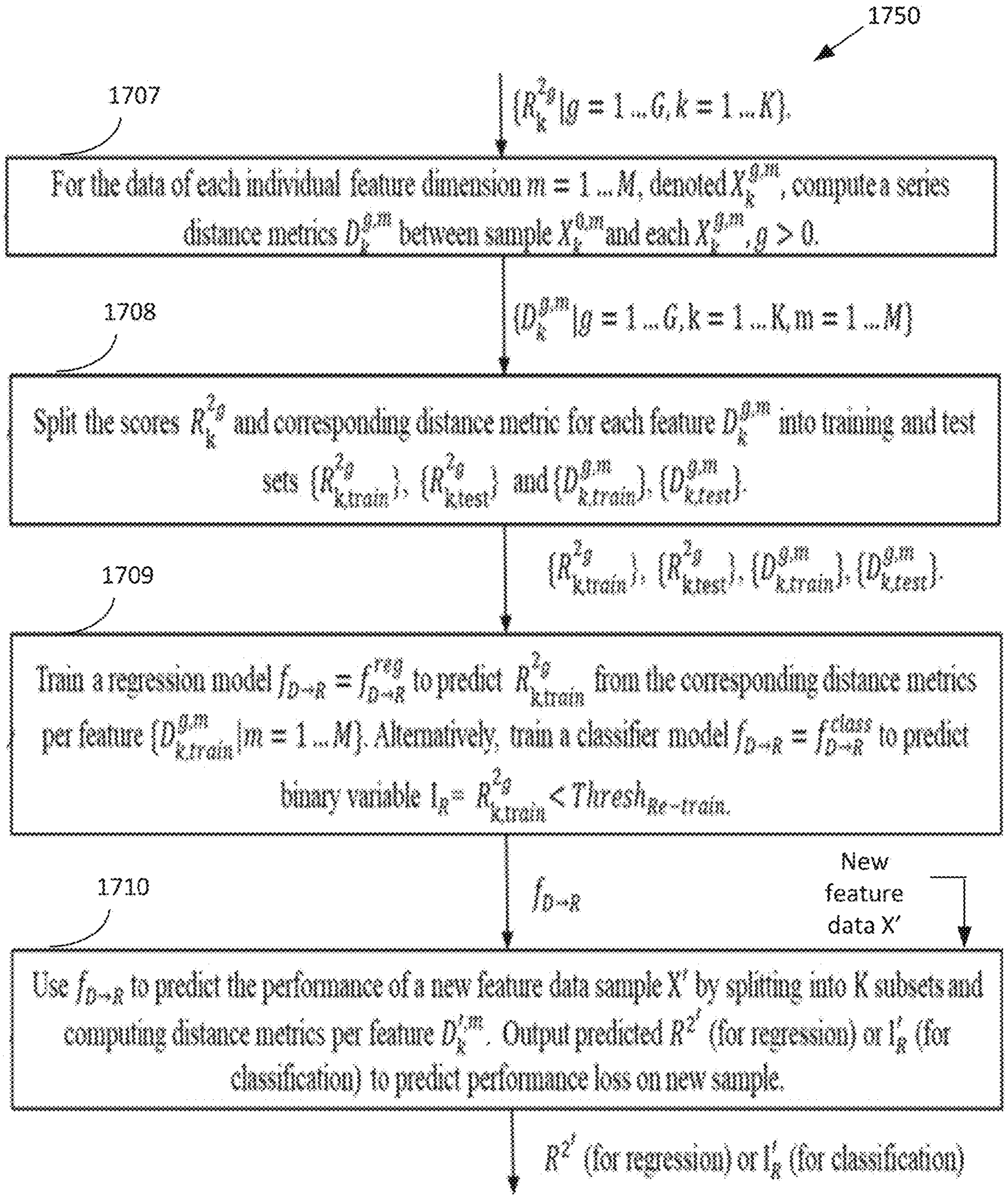
FIG. 17B illustrates another flowchart of a method for predicting performance loss from changes in feature distributions according to embodiment of the present disclosure.

FIG. 17B illustrates another flowchart of a method 1750 for predicting performance loss from changes in feature distributions according to embodiment of the present disclosure. The method 1750 as may be performed by a computing device (e.g., 104, 106, 116, and 200 as illustrated in FIG. 1, or the computing device can be implemented a network entity, network node, or a server in a network 102 as illustrated in FIG. 1). An embodiment of the method 1750 shown in FIG. 17B is for illustration only. One or more of the components illustrated in FIG. 17B can be implemented in specialized circuitry configured to perform the noted functions or one or more of the components can be implemented by one or more processors executing instructions to perform the noted functions.

FIG. 17A and FIG. 17B are connected each other at step 1706. As illustrated in FIGS. 17A and 17B, the output of operation 1706 is inputted to the operation 1707.

An alternative embodiment to the above method is presented in FIG. 17. In operations 1701-1703, the dataset S is partitioned into groups g, the reference set $S^{g=0}$ is split into training and test sets, which are further split into K subsets $$\{S^0_{train,k}\} \text{ and } \{S^0_{test,k}\}.$$

In operation 1704, models $f_k$ are trained on each respective $$S^0_{train,k}$$

and tested with held-out data $$S^0_{test,k}.$$

Note that the models $f_k$ may share the same hyperparameter settings. In operation 1705, the non-reference sets $S^g$, g>0 are each split into K subsets $$S^g_k$$

and, in operation 1706, they are tested with the respective model $f_k$ to yield accuracy scores $$R_k^{2g}.$$

Next, in operation 1707, a series of univariate distance metrics $$D_k^{g,m}$$

are computed for each individual feature dimension m=1 . . . . M, denoted $$X_k^{g,m}$$

by means of a two-sample test between sample $$X_k^{0,m}$$

and each $$X_k^{g,m},\ g > 0.$$

In 1708, the scores $$R_k^{2g}$$

and corresponding distance metrics for each feature dimension m, denoted $$D_k^{g,m},$$

are split into training and test sets $$\{R_{k,train}^{2g}\}, \{R_{k,test}^{2g}\} \text{ and } \{D_{k,train}^{g,m}\}, \{D_{k,test}^{g,m}\}.$$

In 1709, a regression model $f_{D\to R}$ is trained to predict $$R_{k,train}^{2g}$$

from the corresponding distance metrics per feature $$\{D_{k,train}^{g,m} \mid m = 1 \ldots M\}.$$

Alternatively, a classifier model $$f_{D\to R} = f_{D\to R}^{class}$$

is trained to predict binary variable IR is trained to predict when the model $f_k$ performance decreases below a threshold, written as $$I_R = R_{k,train}^{2g} < \text{Thresh}_{Re-train.}$$

In 1710, the model $f_{D\to R}$ may be used with a new sample of feature X' to predict the accuracy score $R^{2}$', for regression, or instance of performance degradation $$I'_R,$$

in the case of classification. Again, the advantage of this approach is that samples of the predicted variable y' corresponding to covariate features X' do not need to be measured to determine if predictive performance may have decreased due to covariate shift. Also, as with previous embodiments, the historic sample S used for building the model $f_{D\to R}$ may be generated by one or more network devices.

The intuition behind using an ML model to predict the performance of another model based on distance metrics for different features is that it is observed in the evaluation that some features have a strong correlation between their statistical distance and model performance, which is reasonable to expect for some but not all features. The performance prediction model $f_{D\to R}$ thus captures the predictive information from these correlated features, while learning which other features are not relevant. Also, by including multiple types of distance metrics, e.g., both CVM and KS statistics, in the input data, different intermediate features of the distributional differences can be extracted.

In the present disclosure, the methods provided in the present disclosure using artificially-generated data is provided. The data is generated for a number of tests, in which different magnitudes of dataset shift are induced in each test case. Random data for each test case is generated by the following equations:

$$x_{i,j} = \aleph(\mu_j^x, \sigma_j^2) + \aleph(0, \sigma_{noise}^2) + \frac{\mu_j^x}{4}\cos\left(\frac{2\pi i}{100}\right),$$
$$i = 1 \ldots N,$$
$$j = 1 \ldots M$$

and $$z_{i,j} = \aleph(\mu_j^z, \sigma_j^2) + \aleph(0, \sigma_{noise}^2) + \frac{\mu_j^z}{4}\cos\left(\frac{2\pi i}{100}\right),$$
$$i = 1 \ldots N,$$
$$j = 1 \ldots M.$$

In each test case, two sets of feature data X={$x_{i,j}$} and Z={$x_{i,j}$} of dimension M are generated with N sample points, with i denoting the sample index and j the feature index, according to the procedure below. Again, dataset X may be referred to as Group 1 and Z as Group 2. Group 1 samples are generated independently for each feature j by sampling a normal distribution with mean $$\mu_j^x$$

and variance $$\sigma_j^2.$$

Noise with 0 mean and variance $$\sigma_{noise}^2$$

is then added along with a cosine signal with a period of 100 samples and magnitude $$\left|\frac{\mu_j^x}{4}\right|.$$

The means $$\mu_j^x, \mu_j^z$$

are uniform RVs distributed between −10 and 10 and the variances $$\sigma_j^2$$

are uniform RVs distributed between 1 and 9. The purpose of adding the cosine signal is to simulate a seasonal behavior. Thus, due to Gaussian noise and seasonal variations, distributional changes between different sub-samples of X may occur. Similarly, samples for Z are generated with per-feature mean and variance $$\mu_j^z$$

and variance $$\sigma_j^2.$$

Data for Group 1 and Group 2 samples are generated for different test cases with different values of $$\mu_j^z \text{ and } \sigma_{noise}^2$$

per the following procedure: (1) select a noise variance from one of the following values:

$$\sigma_{noise}^2 = \{0, 1, 4\}; \tag{2}$$

randomly select $M_{diff}$ feature indices j for Group 2, where $M_{diff}$ takes one of the following 4 values: $M_{diff} \in \{0, 1, 2, 5\}$; (3) for each of the $M_{diff}$ selected features for Group 2, set the mean $$\mu_j^z = \beta\mu_j^x$$

where β takes one of the following 4 values: β∈{1.01, 1.05, 1.1, 1.5}; and (4) for all other features of Group 2, set the mean equal to the corresponding Group 1 mean, $$\mu_j^z = \mu_j^x.$$

Different test cases are simulated for each combination of $M_{diff}$, β and $$\sigma_{noise}^2$$

for a total of 37 cases. For each test case, 10 trials are performed with different artificial datasets generated. Then, the procedure in the present disclosure is followed to repeatedly sample the Group 1 data L=100 times and generate a distribution of test statistics $$\{D_l^{X-X} | l = 1 \ldots 100\}.$$

The statistics $$\{D_l^{X-Z}\}$$

are also computed between different samples from Group 1 and Group 2. The KS statistic, KS p-value, Anderson-Darling statistic and Cramer-von Mises statistic and p-value, along with the JS distance are computed in each case. The results from these experiments are provided in the following.

Figure 18:
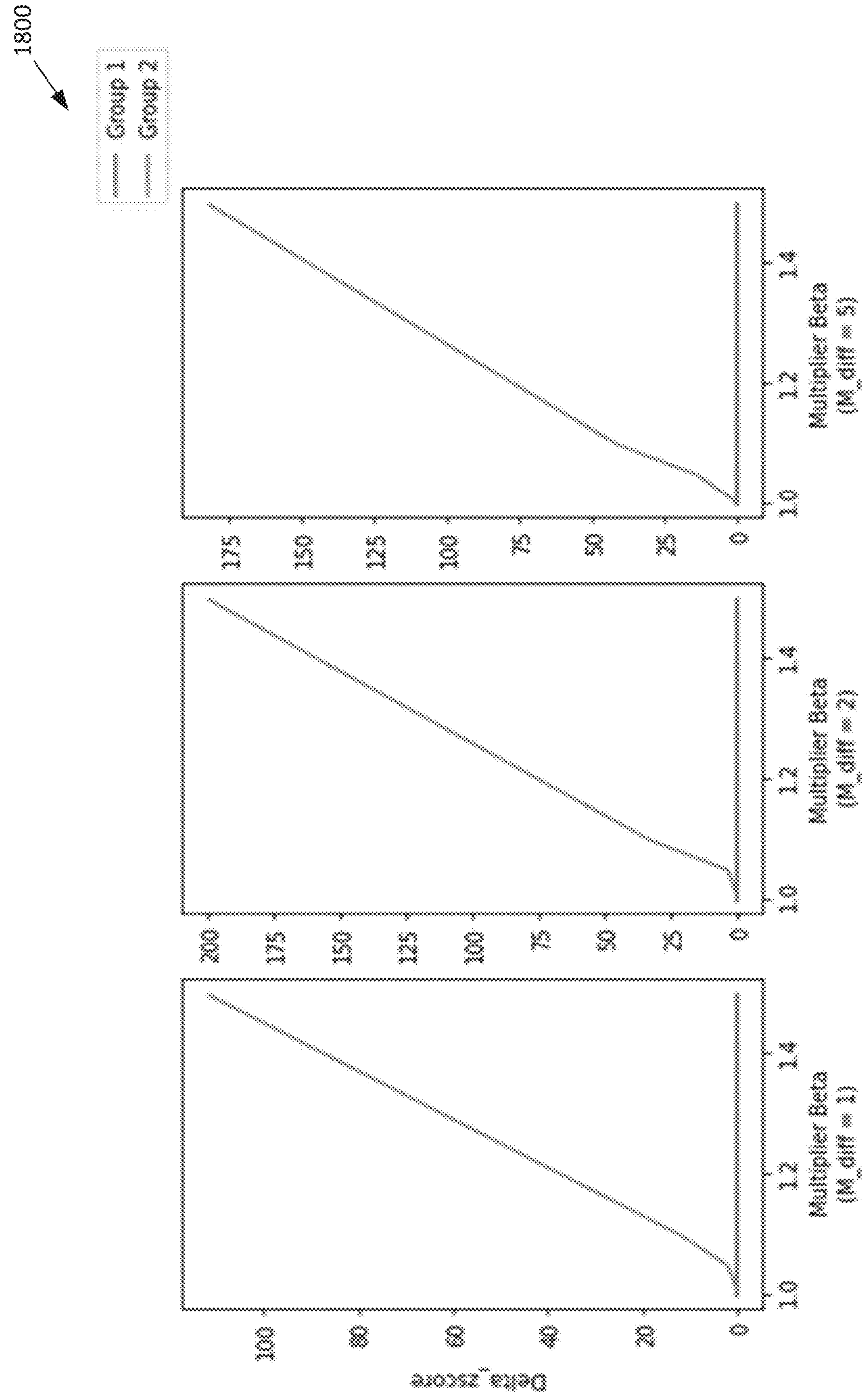
FIG. 18 illustrates an example of CVM statistic-based Z-score computed between samples of group 1 and samples of group 2 according to embodiments of the present disclosure.

FIG. 18 illustrates an example of CVM statistic-based Z-score computed between samples of group 1 and samples of croup 2 1800 according to embodiments of the present disclosure. An embodiment of the CVM statistic-based Z-score computed between samples of group 1 and samples of croup 2 1800 shown in FIG. 18 is for illustration only.

To measure the deviation between Group 1 in Group 2 by the method provided in the present disclosure, the scoring function $$\sigma^{X-Z} = \Delta_{z-score}\left(D^{X-Z}, \{D_l^{X-X}\}\right)$$

is computed for each test case. $\Delta_{z\text{-}score}$ is plotted for different $M_{diff}$ and $$\sigma_{noise}^2 = 0,$$

with the scores derived from the CVM statistic. As shown, scores are monotonically increasing with the amount of dataset shift induced by varying $M^{diff}$ and β, except for the case of $M^{diff}$=5 and β=1.5, which is observed to be less than $M_{diff}$=2, β=1.5.

However, the difference between the values in these two cases is minor and the unexpected behavior can be explained by random sampling and since the score is quite sensitive to the mean and variance of the Group 1 statistics $$\{D_i^{X-X}\}.$$

Thus, it is demonstrated that such a score is useful for measuring the relative magnitude of dataset shift, as is the objective of the provided method provided in the present disclosure. Similar results are obtained for the KS, AD and JS statistics.

Figure 19:
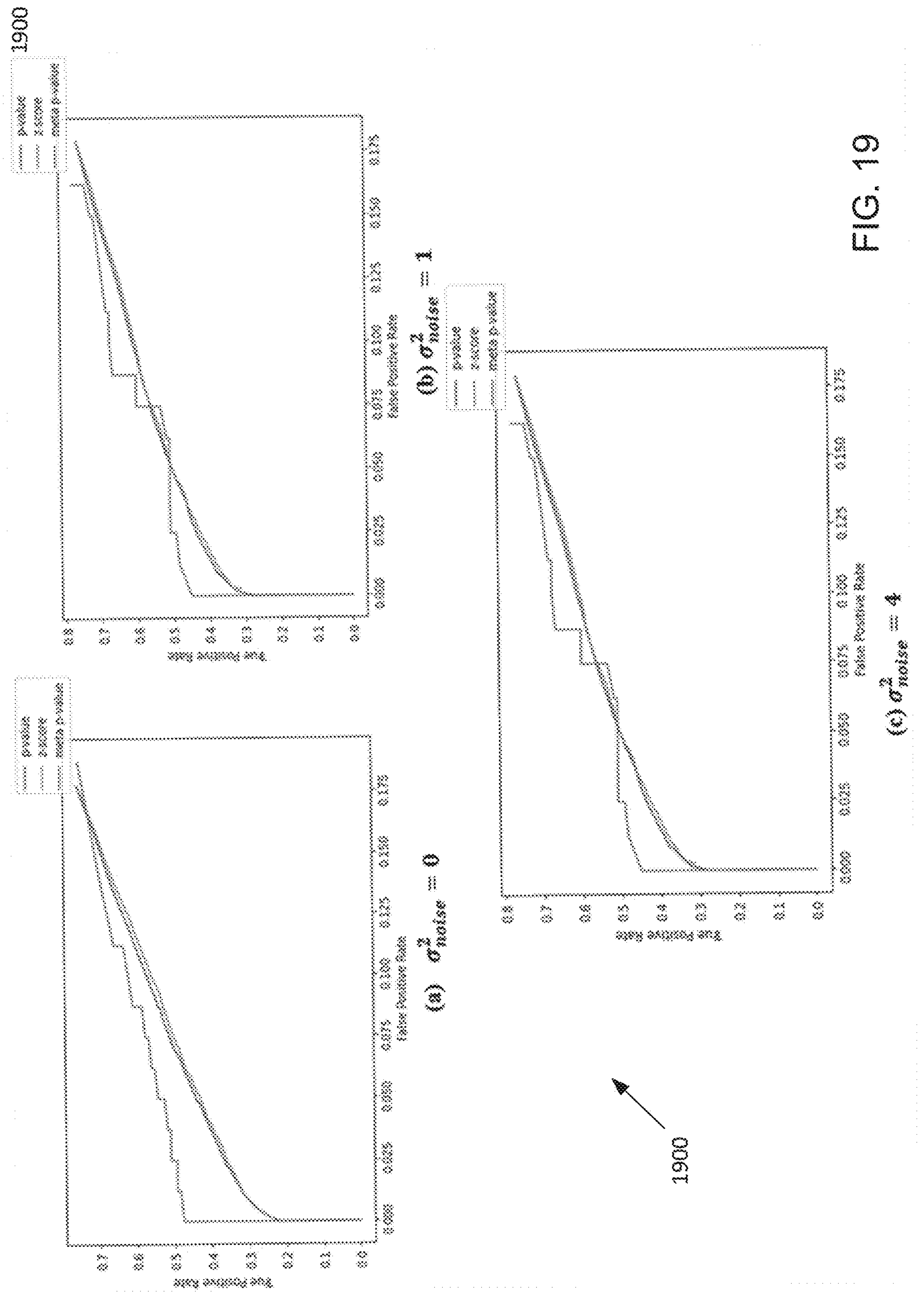
FIG. 19 illustrates an example of TPR and FPR for baseline P-value, Z-score and meta P-value according to embodiments of the present disclosure.

FIG. 19 illustrates an example of TPR and FPR for baseline P-value, Z-score and meta P-value 1900 according to embodiments of the present disclosure. An embodiment of the TPR and FPR for baseline P-value, Z-score and meta P-value 1900 shown in FIG. 19 is for illustration only.

Analysis of the detection performance of the provided methods is then performed, with results provided in FIG. 19. As a baseline for comparison, the p-values derived from sampling Group 1 and Group 2 and computing the CVM test is provided in the above figures. To determining the FPR for different confidence levels, the p-value is computed by sampling pairs of subsets from Group 1 and computing the CVM test. Then, the FPR is the mean number of sample pairs from Group 1 with a p-value less than the given confidence level. For determining the true positive rate (TPR), the CVM test is performed on sample pairs from Group 1 and Group 2, selected as described in method 800 and 900, and the resulting p-values are compared to different confidence levels. P-values less than the given confidence are considered true positives, in this case. Additionally, the Z-score based method from method 800 is evaluated by comparing the score to a threshold as follows: $\sigma^{X-Z}$>quantile $(\{\sigma^{X-X}\}, 1-\text{conf}\}$.

As discussed in the present disclosure, the key advantage of the scoring approach in method 800 is that it allows setting a threshold on the score relative to the Group 1 distribution in order to control the FPR. In the above, the detection threshold is set to the 1−conf quantile of the set of Group 1 z-scores $\{\sigma^{X-X}\}$. Finally, method 900 is tested by comparing the empirical distributions of Group 1 and Group 2 statistics $$\{D_i^{X-X}\} \text{ and } \{D_i^{X-Z}\}$$

also using the CVM test, computing the "meta" p-value and comparing it to a confidence level.

The results for the baseline case and two provided methods are shown in FIG. 19. It may be seen that the Z-score method effectively matches the baseline method, which is expected since this method does not consider multiple samples $$\{D_i^{X-Z}\}$$

from Group 2. However, it may be seen the improved detection performance from the meta p-value test from method 900. This is also expected, since the distributions of CVM statistics from both Group 1 and Group 2 are compared in the secondary two-sample test to determine the meta p-values. It is demonstrated that this method outperforms the baseline for the no-noise case, as well as for noise variances of 1 and 4 in the artificial data.

In the present disclosure, the application of the methods is demonstrated using real-world PM field data from a major US cellular operator's network. The dataset contains approximately 7 months of data (from April to November 2021) from 141 different cells. 104 KPIs are selected from the PM data for testing, some of which are custom synthetic KPIs computed from the raw data. Additional processing includes filtering out data for weekends and holidays and outside of the busy hours of 8:00 to 21:00 local time, as described in the present disclosure.

Also, for QCI-dependent KPIs, only data for QCI=1 is selected. The data is partitioned based on known parameter changes from the CM data, such that there are no changes to the network configuration within the same time interval as the partition data. The partitions belonging to each unique combination of parameter settings are then grouped and each "parameter combination" group is further partitioned by hour of the day, as illustrated in FIG. 12: Segmentation of training and test data for different time periods. Specifically, data points are grouped into 6-hour intervals, labeled hour groups 1-4. The statistics of pairs of each parameter comb. group is compared using the techniques in the present disclosure for each individual hour interval.

Figure 20:
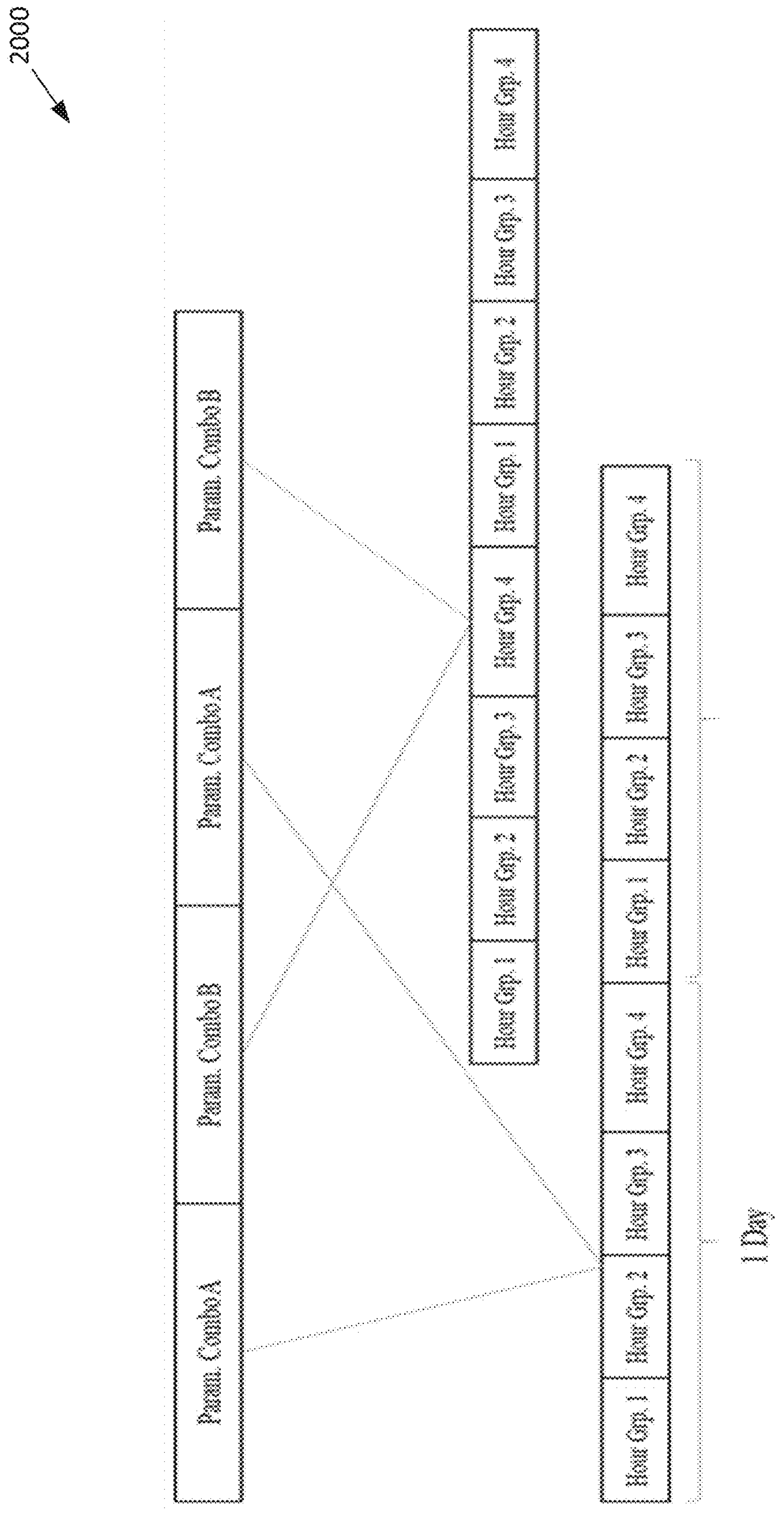
FIG. 20 illustrates an example of segmentation of training and test data according to embodiments of the present disclosure.

FIG. 20 illustrates an example of segmentation of training and test data 2000 according to embodiments of the present disclosure. An embodiment of the segmentation of training and test data 2000 shown in FIG. 20 is for illustration only.

Figure 21:
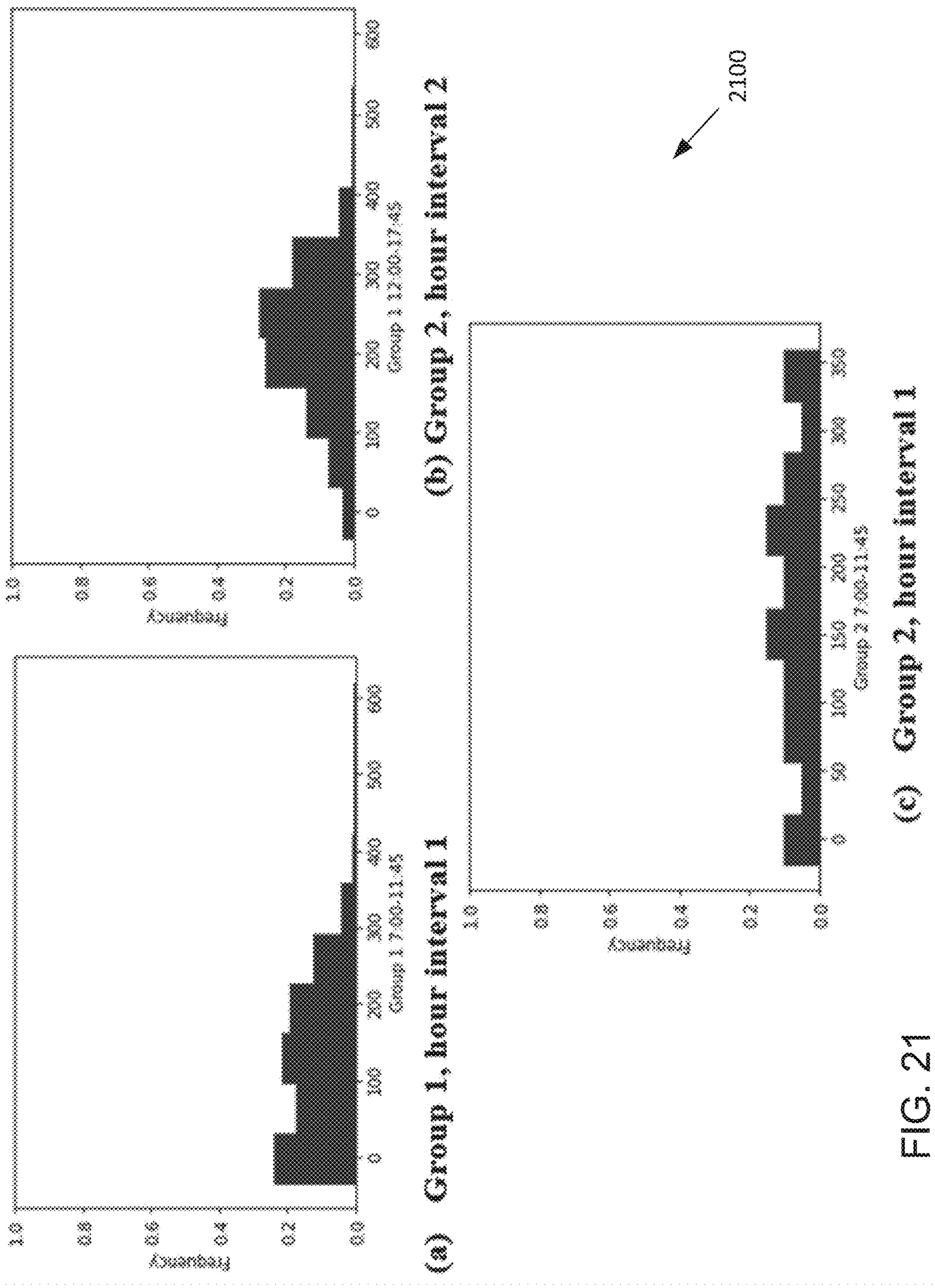
FIG. 21 illustrates an example of distribution of IP throughput KPI values at different time intervals for group 1 (pre-change) and group 2 (post-change) for a selected cell according to embodiments of the present disclosure.

FIG. 21 illustrates an example of distribution of IP throughput KPI values at different time intervals for group 1 (pre-change) and group 2 (post-change) for a selected cell 2100 according to embodiments of the present disclosure. An embodiment of the distribution of IP throughput KPI values at different time intervals for group 1 (pre-change) and group 2 (post-change) for a selected cell 2100 shown in FIG. 21 is for illustration only.

Figure 22:
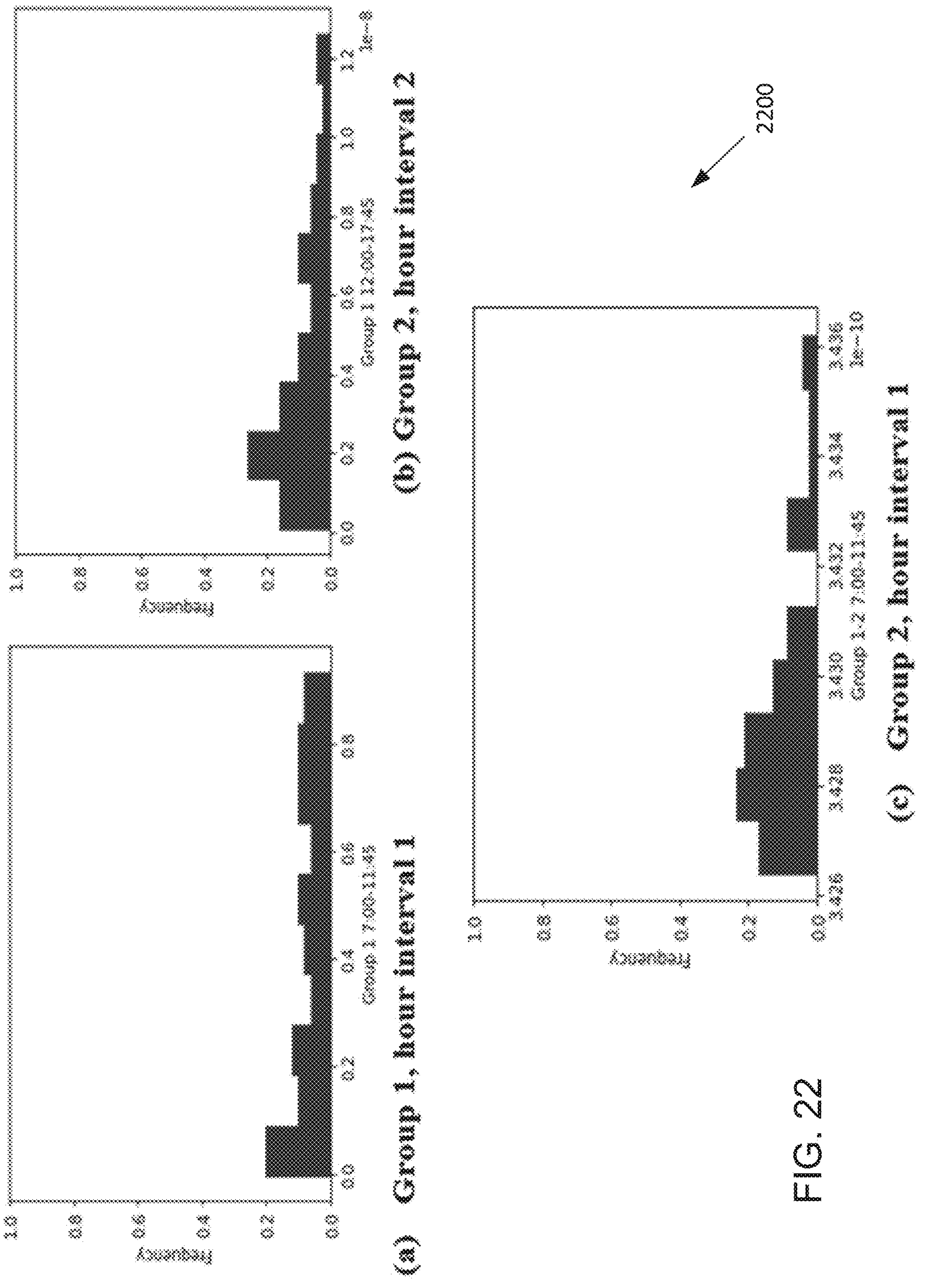
FIG. 22 illustrates an example of distribution of CVM P-values at different time intervals for group 1 (pre-change) and group 2 (post-change) for a selected cell according to embodiments of the present disclosure.

FIG. 22 illustrates an example of distribution of CVM P-values at different time intervals for group 1 (pre-change) and group 2 (post-change) for a selected cell 2200 according to embodiments of the present disclosure. An embodiment of the distribution of CVM P-values at different time intervals for group 1 (pre-change) and group 2 (post-change) for a selected cell 2200 shown in FIG. 22 is for illustration only.

In FIG. 21, the histogram of EutranIpThroughput KPI values at different time intervals for two parameter combo groups, denoted Group 1 and Group 2 are shown. As shown, the distributions of values vary considerably depending on the time of day (7:00-11:45 and 12:00-17:45 local time). Furthermore, the distribution for the same 7:00-11:45 interval differs between parameter combo groups Group 1 and Group 2. As a result, the distribution of p-values differ between different sub-samples the Group 1 data at hour interval 1 ((a) of FIG. 22) differ noticeably from the p-values of comparing samples hour intervals 1 and 2 of Group 1 ((b) of FIG. 22). In the former, the distribution of p-values is computed from sub-sampling different contiguous intervals of timestamps within Group 1 for hour interval 1 (as opposed to random sampling), and is shown to have a median p-value of 0.57.

In the latter case, random samples from different hour intervals of Group 1 are compared to yield a p-value distribution with median of $3e^{-9}$. In FIG. 22 (e.g., (c)), the distribution of p-values from comparing random samples from hour interval 1 of Group 1 and Group 2 is shown to have an even lower median p-value of $3.4e^{-10}$. The p-values in each case are computed by performing the classifier-based GoF test in the present disclosure over all 104 features and using the CVM test to compare the univariate classifier prediction probabilities over a test set. Thus, one may conclude that the dataset distributions may differ between hour intervals for a single parameter combo group, and may differ between parameter combo groups to an even greater magnitude. Therefore, the idea of time-based and parameter setting-based context grouping is supported.

Figure 23:
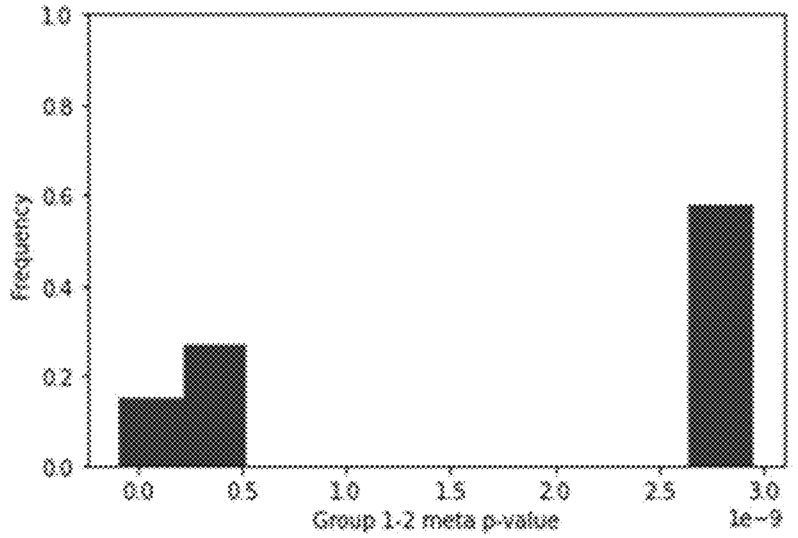
FIG. 23 illustrates an example of P-values from two-sample tests on CVM statistics for data grouped by hour interval context with data not grouped by context according to embodiments of the present disclosure.
Figure 23:
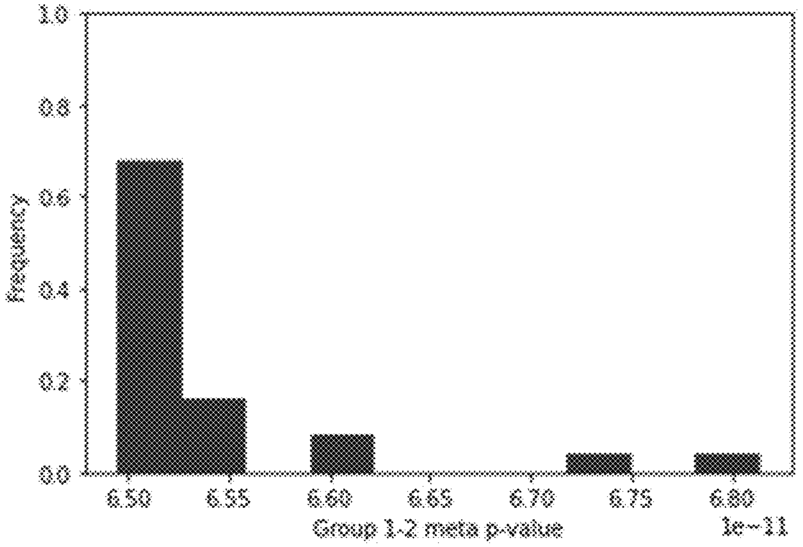

FIG. 23 illustrates an example of P-values from two-sample tests on CVM statistics for data grouped by hour interval context with data not grouped by context 2300 according to embodiments of the present disclosure. An embodiment of the P-values from two-sample tests on CVM statistics for data grouped by hour interval context with data not grouped by context 2300 shown in FIG. 23 is for illustration only.

Furthermore, in the above FIG. 23, the empirical distributions of meta p-values from performing a multivariate two-sample test between Group 1 and Group 2 data are shown and then performing a further two-sample test to compare the distributions of resulting statistics are shown, as in method 900. The p-values for the case is compared where data is partitioned by 6-hour interval versus not grouping the data by context, and simply considering all data belonging to Group 1 and Group 2 as single datasets. The median p-value is found to be $3.1e^{-9}$ for the case of hourly context grouping and $6.5e^{-11}$ without context grouping. In both cases yield p-values that are well below standard confidence levels and may result in detections of dataset shift, due to the significant change in the distributions likely resulting from the configuration change. Still, the result suggests that context grouping may yield fewer false positives under cases of less extreme dataset shift, due to reducing the variance of data within each context group.

Figure 24:
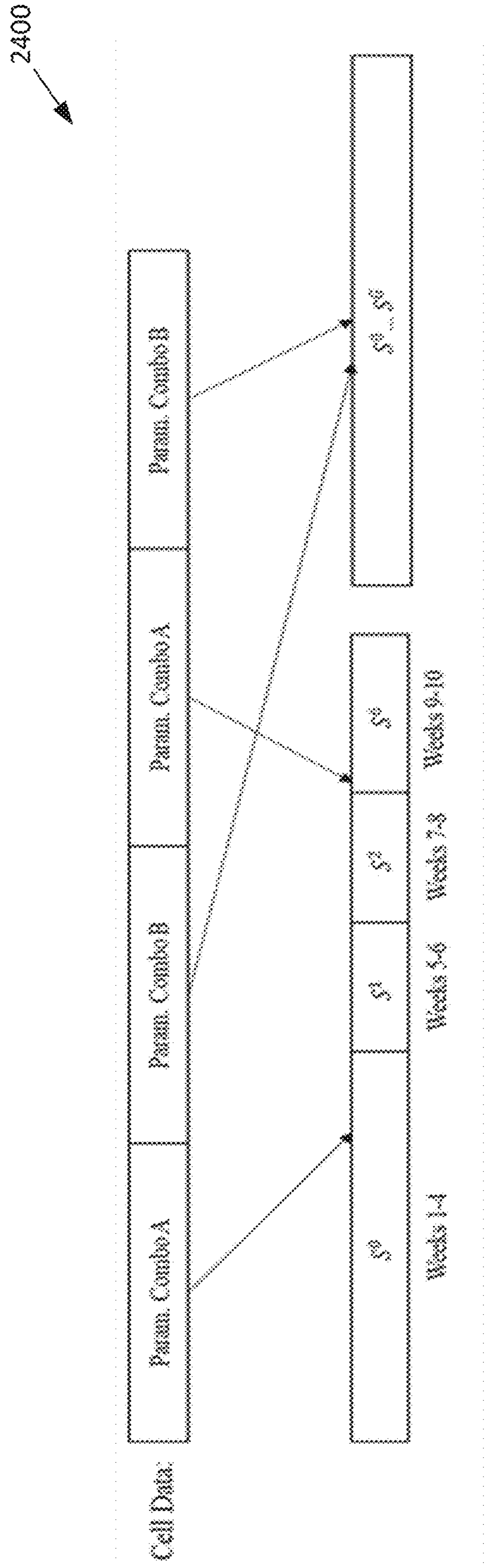
FIG. 24 illustrates an example of data partitioning and week grouping according to embodiments of the present disclosure.

In the present disclosure, a method is evaluated using the same real-world dataset from the present disclosure. The data is partitioned based on known parameter changes from the CM data, such that there are no changes to the network configuration within the same time interval as the partition data. Since CM changes are a major factor that can influence the data distribution, it is desirable to control for these changes in the test data. The data for each cell is therefore grouped so that each group has the same associated CM settings, as shown in FIG. 24. The data is then further grouped by time, as described at a high-level in the present disclosure. The Group 1 data, denoted $S^0$, includes the initial 4 weeks of data, with each subsequent group $S^g$ of data for Group 2 includes 2 weeks of data.

FIG. 24 illustrates an example of data partitioning and week grouping 2400 according to embodiments of the present disclosure. An embodiment of the data partitioning and week grouping 2400 shown in FIG. 24 is for illustration only.

The procedure then follows from FIGS. 17A and 17B, in which 80% of the points in $S^0$ are randomly sampled for the training set, with the remaining being assigned to the test set. The training and test sets are then further sub-sampled (with replacement) into K=100 subsets, which are used to train K random forest regression models to predict the target variable PdcpSduLossRateUL(QCI1) from the 103 other KPI features. The $$R^2_{test}$$

is then computed for each of the K regression models using both the Group 1 test data and Group 2 data for each sample k. At this point, training is still performed separately for data from different cells and partitions for different CM settings. TABLE 1 shows spearman correlation.

TABLE 1

Spearman Correlation Between $R^2_{test}$ and Test Statistics $D$ for Different Feature Variables

| Feature | CVM Statistic | CVM P-value |
|---|---|---|
| PdcpSduLossRateUL | −0.39 | 0.37 |
| TotTtibPrbULUsed | −0.42 | 0.30 |
| ULVoLTEHARQFail | −0.27 | 0.28 |
| UEActiveDLAvg | −0.26 | 0.27 |
| TotTtibQCI1PrbULUsed | −0.42 | 0.26 |
| UEActiveULAvg | −0.22 | 0.24 |
| DLVoLTEHARQFail | −0.33 | 0.24 |
| RoHCDecompFailRate | −0.23 | −0.23 |
| ErabConnectionFailureRate | −0.20 | −0.20 |

The above figure shows that there is a strong correlation between some test statistics, such as the CVM statistic and p-value, and the test $R^2$. This motivates the use of training a further model to predict the $R^2$ performance from these test statistics per each feature. In this case, an operation trains a classifier model to predict when the $R^2$ has dropped below a threshold equal to half of the median $$R^{2o}_{k,test},$$

i.e., the median test $R^2$ from predicting the target variable using K samples of Group 1 test data. More formally, this may be written as follows:

$$\text{Thresh}_{Re-train} = \frac{1}{2}\text{median}\left(\left\{R^{2o}_{k,test}\right\}\right).$$

In one embodiment of the choice of this threshold is intuitive, if the $R^2$ from future samples of new data is degraded by more than half of the original test $R^2$, then it is reasonable to re-train the regression model with new data to improve its performance. Next, the resulting $R^2$ values and test statistics are split into training and test sets and random forest classifier is trained to predict the binary outcome $I_R=R^2<\text{Thresh}_{Re-train}$ using the CVM statistics of each feature, i.e., the distance between the Group 1 and Group 2 data for each sample k.

10-fold cross validation is performed, which yields a mean classification accuracy of 0.72. This shows that it is possible to predict, with reasonable accuracy, model performance loss from sampled covariate statistics alone.

Figure 25:
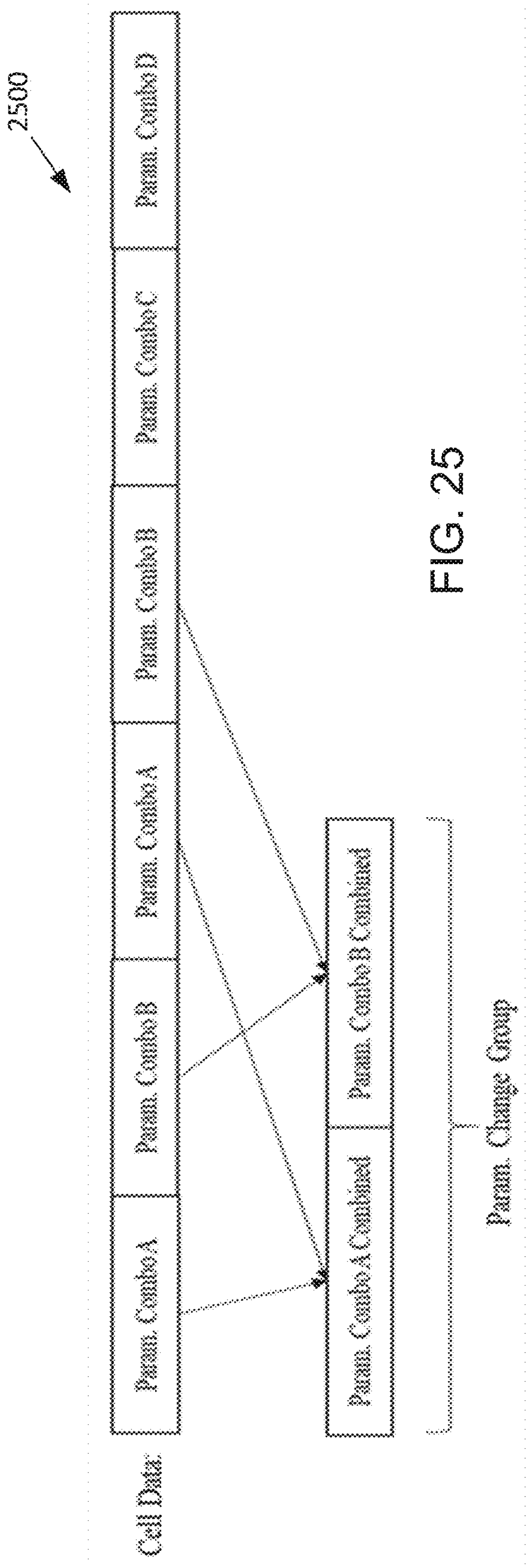
FIG. 25 illustrates an example of data partitioning for CM change performance impact analysis according to embodiments of the present disclosure.

FIG. 25 illustrates an example of data partitioning for CM change performance impact analysis 2500 according to embodiments of the present disclosure. An embodiment of the data partitioning for CM change performance impact analysis 2500 shown in FIG. 25 is for illustration only.

In the present disclosure, the techniques introduced in the present disclosure are demonstrated using the real-world dataset described previously. Firstly, each cell-level dataset is partitioned by parameter change event. Then, for each distinct parameter change, identified by a set of pre- and post-values for one or more parameters, the pre-change and post-change data for the same type of change are combined together as a parameter change group, as illustrated in FIG. 25. In the following analysis, the parameter change type with the most instances across all cells in the dataset is selected. The selected handover-related parameter combination and the pre- and post-change values are provided in TABLE 2. The combined pre-change data for each cell is referred to as Group 1 and the combined post-change data Group 2.

TABLE 2

Selected CM parameter change

| Parameter | Pre | Post |
|---|---|---|
| a1-threshold-rsrp | 30 dBm | 28 dBm |
| hysteresis (A1) | 0 dB | 2 dB |
| a2-threshold-rsrp | 27 dBm | 26 dBm |
| hysteresis (A2) | 0 dB | 2 dB |
| a5-threshold1-rsrp | 25 dBm | 27 dBm |

To evaluate the provided methods, the feature statistics from Group 1 (pre-change) and Group 2 (post-change) are compared using the CVM univariate two-sample test. The Group 1 and Group 2 data for cell c are sampled into G=100 pairs of subsets, denoted $$X_c^{1,g} \text{ and } X_c^{2,g},\ g = 1 \ldots 100,$$

respectively, and the CVM test is applied to compute the distance between distributions for each feature variable m=1 . . . 72 for each sample pair, denoted $$D_c^{g,m}.$$

Then, the mean of the statistics $$\bar{D}_c^m = \text{mean}(\{D_c^{g,m}\})$$

over all sample pairs is taken and the means are then individually scaled to be between [0,1] across each feature dimension, with the scaled versions given the notation $$\bar{D}_{c,scaled}^m.$$

Agglomerative clustering with Ward linkage is then performed over the set of scaled statistics $$\bar{D}_{c,scaled}^m$$

for all cells c. In this experiment, the 68 cells with the same type of parameter change are clustered. Since agglomerative clustering requires the number of resulting clusters K to be specified, multiple clusterings are generated over several trials (random initializations of the clustering algorithm) with K=2 . . . 10 and a silhouette score is computed to evaluate the quality of each clustering. The silhouette scores for each trial for a given K is averaged and the cluster number with the highest mean score is selected, which is found to be K=2.

In the present disclosure, features are analyzed based on their contribution to the cluster formation by computing the absolute difference between the means of the points in each cluster. As shown in TABLE 3, distinct separation between the distributions of feature statistics of each cluster indicates that features are impacted differently, whereas a more ambiguous separation indicates a similar impact by the parameter change. Again, the motivation for this approach is to better understand how CM changes impacts some cells differently. By looking at which features were strongly impacted (with higher CVM statistic values) in some cases and weakly impacted (with lower CVM statistics) in other cases, engineers can assess possible root causes for why some cells behaved differently.

TABLE 3

Examples of features with high separation between clusters

| KPI | $Dist_{1-2}^m$ | Separation |
|---|---|---|
| SEA_X2HOFailRate_% | 0.70 | Strong |
| CallDrop_EccbRadioLinkFailure | 0.68 | Strong |
| DLVoLTECQIMax | 0.65 | Strong |
| SMI_WeightedDLVoLTECQI | 0.005 | Weak |
| HoTriggeringScellRsrpEventA3Avg | 0.004 | Weak |
| SMI_WeightedULSinrWbPostComp | 0.002 | Weak |

Advanced network analytics capabilities are highly sought after by cellular operators. In one embodiment of multivariate dataset shift detection, a competitor's product may display in user interface, or provide through an API, scores measuring statistical differences between one or more sets of data relative to a reference set of data. If such scores are described as being relative to a reference distribution, then infringement is likely.

In one embodiment of context-based anomaly detection, a competitor's product may display in a user interface, or provide through an API, indications of statistical changes between sets of data which may indicate abnormal behavior (i.e., anomaly events), where the datasets are associated with some context, such as time period, weather condition, parameter change or other condition. If the product provides additional information pertaining to the environment or time window associated with detected anomalies, then infringement is likely.

In one embodiment of profiling performance impact of network configuration changes, a competitor's product may display in a user interface, or provide through an API, analytics information and visualization for analyzing KPI impact of different parameter changes on different network devices, which are derived from measuring statistical differences between groups of data.

In one embodiment of predicting model performance loss based on dataset shift, a competitor's product may display in a user interface, or provide through an API, indications of model performance or other analytics information relating, which are determined based on differences between the distributions of training and test feature data. Also, if an AI model (e.g., in an O-RAN deployment) is triggered to collect new data and re-train based on detection of dataset shift, infringement on the claim may be detectable.

Figure 26:
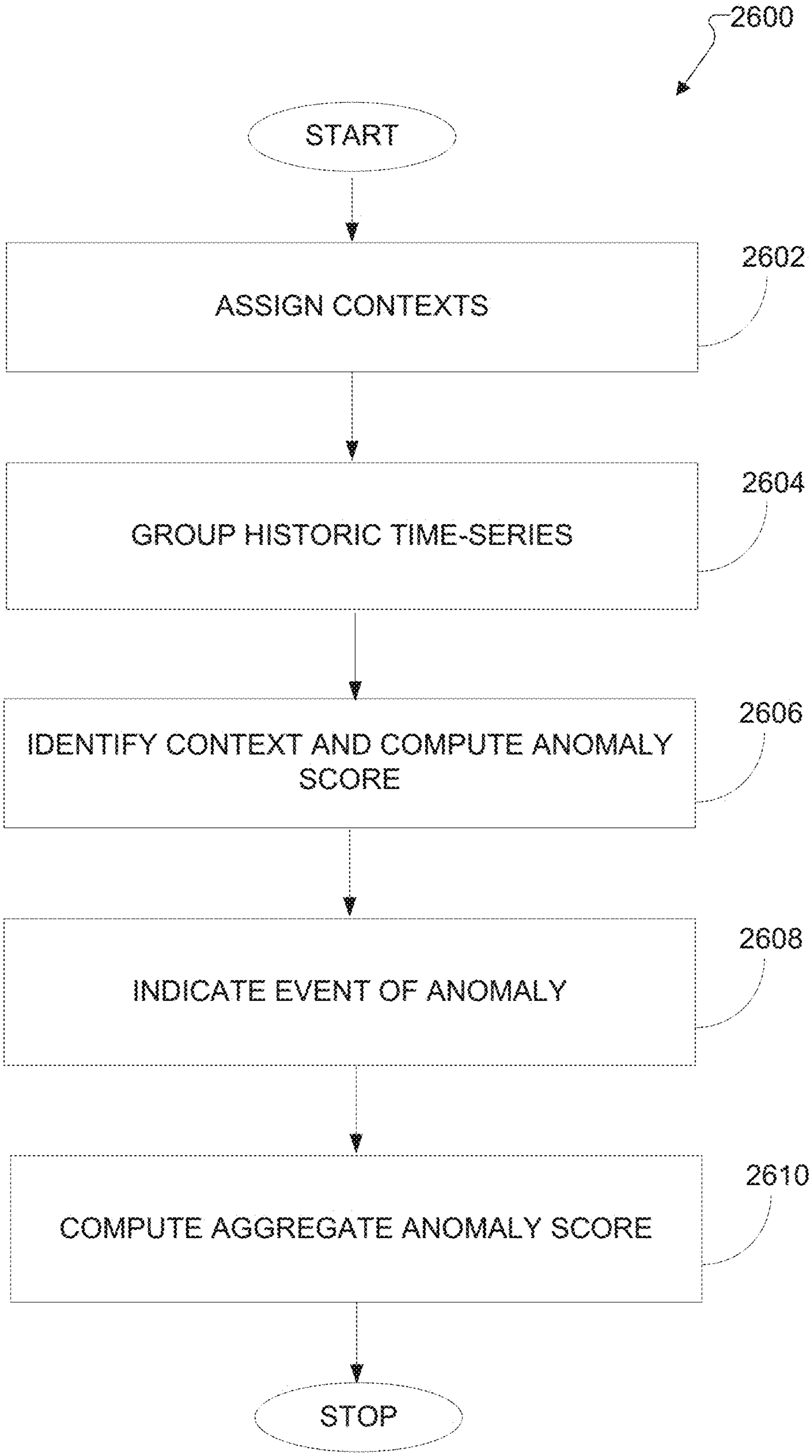
FIG. 26 illustrates an example of method for network analysis using dataset shift detection according to embodiments of the present disclosure.

FIG. 26 illustrates an example of method 2600 for network analysis using dataset shift detection in a communication network according to embodiments of the present disclosure. The method 2600 as may be performed by a computing device (e.g., 104, 106, 116, and 200 as illustrated in FIG. 1, or the computing device can be implemented a network entity, network node, or a server in a network 102 as illustrated in FIG. 1). An embodiment of the method 2600 shown in FIG. 26 is for illustration only. One or more of the components illustrated in FIG. 26 can be implemented in specialized circuitry configured to perform the noted functions or one or more of the components can be implemented by one or more processors executing instructions to perform the noted functions.

As illustrated in FIG. 26, a method 2600 begins at step 2602. In step 2602, a computing device, assigns, based on a correlation analysis, contexts to different time intervals of data, wherein the correlation analysis is performed based on historic time-series data.

In step 2604, the computing device, groups, based on the assigned contexts, the historic time-series data.

In step 2606, the computing device identifies context and compute an anomaly score comparing new data and the grouped historic-time series data of the context.

In step 2608, the computing device indicates an event of anomaly based on a determination that the computed anomaly score exceeds a first threshold that is identified based on a function of per-context data.

In step 2610, the computing device computes, based on the event of the anomaly, an aggregate anomaly score or indicate using a value of mean or moving average of a set of latest anomaly scores, for a context-based multivariate anomaly detection.

In one embodiment, the computing device, uses a multivariate shift detection scheme to identify the context and compute the anomaly score comparing the new data and the grouped historic-time series data of the context.

In one embodiment, the computing device partitions the historic time-series data into pairs of sample groups each of which corresponds to a specific configuration management change across multiple cells.

In one embodiment, the computing device computes a set of distance metrics between each of pairs in the pairs of the sample groups.

In one embodiment, the computing device performs, based on the set of distance metrics, a clustering operation representing a distinct set of cells to assign, corresponding to each of the pairs of sample groups, to a cluster.

In one embodiment, the computing device generates, based on a result of the clustering operation, cluster visualizations for display.

In one embodiment, the computing device performs a dimensionality reduction to reduce a number of statistics of a vector of distance metrics for the pairs of sample groups; and analyze and identifies a KPI contributing to a cluster separation, wherein the pairs of sample groups are identified from different time intervals for the data of the group 1 and the data of the group 2.

In one embodiment, the computing device computes, based on a binary classification scheme, a first set of probability scores of group 1 and a second set of probability scores of group 2; computes, based on repeated sub-sampling data of the group 1, a null distribution of GoF statistics from comparing different sub-sample sets of group 1; computes, based on a difference between the first set of probability scores and the second set of probability scores, a group 1-to-2 GoF statistics; computes, based on group 1-to-1 GOF statistics and the group 1-to-2 GoF statistics, a distance score function to measure an amount of shift between the data of the group 1 and the data of the group 2; and compares the group 1-to-2 GoF statistics with a second threshold to detect the amount of the shift, the second threshold being determined based on a function of the group 1-to-1 GoF statistics.

In one embodiment, the computing device computes a distribution of the group 1-to-2 GoF statistics from multiple pairs of sub-samples of the first set of probability scores of the group 1 and the second set of probability scores of the group 2; identifies, based on a meta GoF scheme, a statistical distance score between the distribution of the group 1-to-1 GOF statistics and a distribution of the group 1-to-2 GoF statistics; and returns the statistical distance score to compute a deviation between the distribution of the group 1-to-1 GOF statistics and the group 1-to-2 GoF statistics.

In one embodiment, the computing device detects the shift by returning a p-value from the meta GoF scheme and comparing with a confidence threshold.

In one embodiment, the computing device identifies a dataset; splits the dataset into multiple time intervals; splits a first time interval of the multiple time intervals into training sets and testing sets; trains a model function on the training set; tests model function on time intervals other than the first time interval of the multiple time intervals; computes, based on a multivariate GoF scheme, a statistical distance metric between test sets and other test sets from the time intervals other than the first time interval; identifies a curve function to map the statistical distance metric to a metric indicating an accuracy or error; and applies the curve function to extrapolate a model performance for samples from a new data stream of the dataset.

In one embodiment, the computing device identifies a dataset; splits the dataset into multiple time intervals; splits a first time interval of the multiple time intervals into training sets and testing sets; splits the first time interval into subsets of the training sets and subsets of the testing sets; trains a model function to each subset of the training sets and test using the subsets of the testing sets; splits time intervals other than the first time interval of the multiple time intervals into other subsets; tests the model function on the time intervals to obtain a metric, the metric comprising an accuracy or error; computes, based on each dimension, a statistical distance metric between the subsets of the training sets and subsets of the other training sets from the time intervals other than the first time interval; splits the statistical distance metric into the training sets and the testing sets, and train a regression mode to predict the accuracy or error metric; and predicts, based on the accuracy or error metric, performance for the new data.

In one embodiment, the computing device trains a classifier to predict the performance when the accuracy or error metric is lower than a third threshold.

The above flowcharts illustrate example methods that can be implemented in accordance with the principles of the present disclosure and various changes could be made to the methods illustrated in the flowcharts herein. For example, while shown as a series of steps, various steps in each figure could overlap, occur in parallel, occur in a different order, or occur multiple times. In another example, steps may be omitted or replaced by other steps.

Although the present disclosure has been described with exemplary embodiments, various changes and modifications may be suggested to one skilled in the art. It is intended that the present disclosure encompass such changes and modifications as fall within the scope of the appended claims. None of the description in this application should be read as implying that any particular element, step, or function is an essential element that must be included in the claims scope. The scope of patented subject matter is defined by the claims.

What is claimed is:

1. A computing device in a communication system, the computing device comprising:

memory; and a processor operably connected to the memory, the processor configured to:

assign, based on a correlation analysis, contexts to different time intervals of data, wherein the correlation analysis is performed based on historic time-series data and each of the different time intervals is associated with a model function to obtain an accuracy or error that is determined based on a threshold, wherein:

the model function is trained to predict performance for the data based on subsets of training sets and subsets of testing sets, each of the subsets of the training sets and the subsets of testing sets being associated with the different time intervals in multiple time intervals, respectively, the accuracy or error is indicated by a metric mapped, by a curve function, to a statistical distance metric, the curve function extrapolating the performance for the data, and a classifier is trained to predict, based on the accuracy or error, the performance by scoring the statistical distance metric that provides a difference between sample data points and a reference sample point when the accuracy or error is lower than a second threshold, group, based on the assigned contexts, the historic time-series data, identify context and compute an anomaly score comparing between new data and the grouped historic-time series data of the context, indicate an event of anomaly when the computed anomaly score exceeds a first threshold that is identified based on a function of per-context data, and compute, based on the event of the anomaly, an aggregate anomaly score or indicate, using a value of mean or moving average of a set of latest anomaly scores, for a context-based multivariate anomaly detection.

2. The computing device of claim 1, wherein the processor is further configured to use a multivariate shift detection scheme to identify the context and compute the anomaly score comparing between the new data and the grouped historic-time series data of the context.

3. The computing device of claim 1, wherein the processor is further configured to:

partition the historic time-series data into pairs of sample groups each of which corresponds to a specific configuration management (CM) change across multiple cells;

compute a set of distance metrics between each of pairs in the pairs of the sample groups;

perform, based on the set of distance metrics, a clustering operation representing a distinct set of cells to assign, corresponding to each of the pairs of sample groups, for a cluster; and generate, based on a result of the clustering operation, cluster visualizations for displaying.

4. The computing device of claim 3, wherein:

the processor is further configured to:

perform a dimensionality reduction to reduce a number of statistics of a vector of distance metrics for the pairs of sample groups, and analyze and identify a key performance indicator (KPI) contributing to a cluster separation; and the pairs of sample groups are identified from different time intervals for data of group 1 and data of group 2.

5. The computing device of claim 1, wherein the processor is further configured to:

compute, based on a binary classification scheme, a first set of probability scores of group 1 and a second set of probability scores of group 2;

compute, based on repeated sub-sampling data of the group 1, a null distribution of goodness-of-fit (GoF) statistics from comparing different sub-sample sets of group 1;

compute, based on a difference between the first set of probability scores and the second set of probability scores, a group 1-to-2 GoF statistics;

compute, based on group 1-to-1 GoF statistics and the group 1-to-2 GOF statistics, a distance score function to measure an amount of shift between data of the group 1 and data of the group 2; and compare the group 1-to-2 GOF statistics with a third threshold to detect the amount of the shift, the third threshold being determined based on a function of the group 1-to-1 GOF statistics.

6. The computing device of claim 5, wherein the processor is further configured to:

compute a distribution of the group 1-to-2 GoF statistics from multiple pairs of sub-samples of the first set of probability scores of the group 1 and the second set of probability scores of the group 2;

identify, based on a meta GoF scheme, a statistical distance score between the distribution of the group 1-to-1 GoF statistics and a distribution of the group 1-to-2 GOF statistics; and return the statistical distance score to compute a deviation between the distribution of the group 1-to-1 GoF statistics and the group 1-to-2 GoF statistics.

7. The computing device of claim 6, wherein the processor is further configured to detect the shift by returning a p-value from the meta GoF scheme and comparing with a confidence threshold.

8. The computing device of claim 1, wherein the processor is further configured to:

identify a dataset;

split the dataset into the multiple time intervals;

split a first time interval of the multiple time intervals into the training sets and the testing sets;

train the model function on the training sets;

test the model function on time intervals other than the first time interval of the multiple time intervals;

compute, based on a multivariate GoF scheme, the statistical distance metric between test sets and other test sets from the time intervals other than the first time interval;

identify the curve function to map the statistical distance metric to the metric indicating the accuracy or error; and apply the curve function to extrapolate a model performance for samples from a new data stream of the dataset.

9. The computing device of claim 1, wherein the processor is further configured to:

identify a dataset;

split the dataset into the multiple time intervals;

split a first time interval of the multiple time intervals into the training sets and the testing sets;

split the first time interval into the subsets of the training sets and the subsets of the testing sets;

train a model function to each subset of the training sets and test using the subsets of the testing sets;

split time intervals other than the first time interval of the multiple time intervals into remaining subsets;

test the model function on the time intervals to obtain the metric, the metric comprising the accuracy or error;

compute, based on each dimension, the statistical distance metric between the subsets of the training sets and the remaining subsets of the training sets from the time intervals other than the first time interval;

split the statistical distance metric into the training sets and the testing sets, and train a regression mode to predict the accuracy or error; and predict, based on the accuracy or error, the performance for the new data.

10. A method in a communication system, the method comprising:

assigning, based on a correlation analysis, contexts to different time intervals of data, wherein the correlation analysis is performed based on historic time-series data and each of the different time intervals is associated with a model function to obtain an accuracy or error that is determined based on a threshold, wherein:

the model function is trained to predict performance for the data based on subsets of training sets and subsets of testing sets, each of the subsets of the training sets and the subsets of testing sets being associated with the different time intervals in multiple time intervals, respectively, the accuracy or error is indicated by a metric mapped, by a curve function, to a statistical distance metric, the curve function extrapolating the performance for the data, and a classifier is trained to predict, based on the accuracy or error, the performance by scoring the statistical distance metric that provides a difference between sample data points and a reference sample point when the accuracy or error is lower than a second threshold;

grouping, based on the assigned contexts, the historic time-series data;

identifying context and compute an anomaly score comparing between new data and the grouped historic-time series data of the context;

indicating an event of anomaly when the computed anomaly score exceeds a first threshold that is identified based on a function of per-context data; and computing, based on the event of the anomaly, an aggregate anomaly score or indicate using a value of mean or moving average of a set of latest anomaly scores, for a context-based multivariate anomaly detection.

11. The method of claim 10, further comprising using a multivariate shift detection scheme to identify the context and compute the anomaly score comparing between the new data and the grouped historic-time series data of the context.

12. The method of claim 10, further comprising:

partitioning the historic time-series data into pairs of sample groups each of which corresponds to a specific configuration management (CM) change across multiple cells;

computing a set of distance metrics between each of pairs in the pairs of the sample groups;

performing, based on the set of distance metrics, a clustering operation representing a distinct set of cells to assign, corresponding to each of the pairs of sample groups, for a cluster; and generating, based on a result of the clustering operation, cluster visualizations for displaying.

13. The method of claim 12, further comprising:

performing a dimensionality reduction to reduce a number of statistics of a vector of distance metrics for the pairs of sample groups; and analyzing and identify a key performance indicator (KPI) contributing to a cluster separation, wherein the pairs of sample groups are identified from different time intervals for data of group 1 and data of group 2.

14. The method of claim 10, further comprising:

computing, based on a binary classification scheme, a first set of probability scores of group 1 and a second set of probability scores of group 2;

computing, based on repeated sub-sampling data of the group 1, a null distribution of goodness-of-fit (GoF) statistics from comparing different sub-sample sets of group 1;

computing, based on a difference between the first set of probability scores and the second set of probability scores, a group 1-to-2 GoF statistics;

computing, based on group 1-to-1 GoF statistics and the group 1-to-2 GoF statistics, a distance score function to measure an amount of shift between data of the group 1 and data of the group 2; and comparing the group 1-to-2 GoF statistics with a third threshold to detect the amount of the shift, the third threshold being determined based on a function of the group 1-to-1 GoF statistics.

15. The method of claim 14, further comprising:

computing a distribution of the group 1-to-2 GOF statistics from multiple pairs of sub-samples of the first set of probability scores of the group 1 and the second set of probability scores of the group 2;

identifying, based on a meta GoF scheme, a statistical distance score between the distribution of the group 1-to-1 GoF statistics and a distribution of the group 1-to-2 GoF statistics; and returning the statistical distance score to compute a deviation between the distribution of the group 1-to-1 GoF statistics and the group 1-to-2 GoF statistics.

16. The method of claim 15, further comprising detecting the shift by returning a p-value from the meta GoF scheme and comparing with a confidence threshold.

17. The method of claim 10, further comprising:

identifying a dataset;

splitting the dataset into the multiple time intervals;

splitting a first time interval of the multiple time intervals into the training sets and the testing sets;

training the model function on the training sets;

testing the model function on time intervals other than the first time interval of the multiple time intervals;

computing, based on a multivariate GoF scheme, the statistical distance metric between test sets and other test sets from the time intervals other than the first time interval;

identifying the curve function to map the statistical distance metric to the metric indicating the accuracy or error; and applying the curve function to extrapolate a model performance for samples from a new data stream of the dataset.

18. The method of claim 10, further comprising:

identifying a dataset;

splitting the dataset into the multiple time intervals;

splitting a first time interval of the multiple time intervals into the training sets and the testing sets;

splitting the first time interval into the subsets of the training sets and the subsets of the testing sets;

training a model function to each subset of the training sets and test using the subsets of the testing sets;

splitting time intervals other than the first time interval of the multiple time intervals into remaining subsets;

testing the model function on the time intervals to obtain the metric, the metric comprising the accuracy or error;

computing, based on each dimension, the statistical distance metric between the subsets of the training sets and the remaining subsets of the training sets from the time intervals other than the first time interval;

splitting the statistical distance metric into the training sets and the testing sets, and train a regression mode to predict the accuracy or error; and predicting, based on the accuracy or error, the performance for the new data.

* * * * *